United States Patent
Tsukamoto

(10) Patent No.: US 10,336,176 B2
(45) Date of Patent: Jul. 2, 2019

(54) VEHICLE

(71) Applicant: HONDA MOTOR CO., LTD., Tokyo (JP)

(72) Inventor: Yoshito Tsukamoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 365 days.

(21) Appl. No.: 15/364,119

(22) Filed: Nov. 29, 2016

(65) Prior Publication Data

US 2017/0158043 A1  Jun. 8, 2017

(30) Foreign Application Priority Data

Dec. 2, 2015 (JP) ................................. 2015-235866

(51) Int. Cl.
*B60K 6/442* (2007.10)
*B60K 6/387* (2007.10)
(Continued)

(52) U.S. Cl.
CPC .............. *B60K 6/442* (2013.01); *B60K 6/365* (2013.01); *B60K 6/387* (2013.01); *B60W 10/02* (2013.01);
(Continued)

(58) Field of Classification Search
CPC ........ B60K 6/442; B60K 6/365; B60W 20/40
(Continued)

(56) References Cited

U.S. PATENT DOCUMENTS 5,934,395 A * 8/1999 Koide .................... F02N 11/006
                                                         180/65.235
7,706,949 B2 * 4/2010 Sah ......................... B60W 10/06
                                                         701/51
(Continued)

FOREIGN PATENT DOCUMENTS

JP  2008-006977   1/2008
JP  2010-126121   6/2010
(Continued)

OTHER PUBLICATIONS

Japanese Office Action for corresponding JP Application No. 2015-235866, dated Nov. 7, 2017 (w/ English machine translation).
(Continued)

*Primary Examiner* — Ha Dinh Ho
(74) *Attorney, Agent, or Firm* — Mori & Ward, LLP

(57) ABSTRACT

A vehicle includes a first power transmission path, a first clutch, a first rotating electrical machine, a second power transmission path, a second clutch, and circuitry. The first clutch is provided in the first transmission path to select a connection state between a first connecting state and a first disconnecting state. The second clutch is provided in the second power transmission path to select a connection state between a second connecting state and a second disconnecting state. The circuitry is configured to control the first clutch and the second clutch such that the second clutch switches to the second disconnecting state in a case where the first clutch switches to the first connecting state so as to transmit the power from an internal combustion engine to a wheel and where a vehicle speed of the vehicle is larger than a first vehicle speed threshold value.

19 Claims, 16 Drawing Sheets

(51) Int. Cl.
*B60W 20/40* (2016.01)
*B60K 6/365* (2007.10)
*B60W 10/02* (2006.01)
*B60W 10/06* (2006.01)
*B60W 10/08* (2006.01)
*B60W 30/18* (2012.01)

(52) U.S. Cl.
CPC ............ *B60W 10/06* (2013.01); *B60W 10/08* (2013.01); *B60W 20/40* (2013.01); *B60W 30/18127* (2013.01); *B60W 2510/0208* (2013.01); *B60W 2520/10* (2013.01); *B60W 2540/12* (2013.01); *B60W 2710/021* (2013.01); *B60Y 2300/91* (2013.01); *B60Y 2400/112* (2013.01); *Y02T 10/6234* (2013.01); *Y02T 10/6286* (2013.01); *Y02T 10/7258* (2013.01); *Y10S 903/914* (2013.01); *Y10S 903/946* (2013.01)

(58) Field of Classification Search
USPC .............................................. 74/335, 665 E
See application file for complete search history.

(56) References Cited

U.S. PATENT DOCUMENTS

| | | | | |
|---|---|---|---|---|
| 8,055,415 | B2* | 11/2011 | Belmont | B60K 6/387 |
| | | | | 180/247 |
| 2001/0051556 | A1* | 12/2001 | Takenaka | B60K 6/36 |
| | | | | 475/5 |
| 2003/0100395 | A1* | 5/2003 | Hiraiwa | B60K 6/365 |
| | | | | 475/5 |
| 2005/0247503 | A1* | 11/2005 | Imazu | B60K 6/445 |
| | | | | 180/300 |

FOREIGN PATENT DOCUMENTS

| | | |
|---|---|---|
| JP | 2013-121788 | 6/2013 |
| JP | 2017-100590 | 6/2017 |
| WO | WO 2012/053361 | 4/2012 |
| WO | WO 2012/108357 | 8/2012 |

OTHER PUBLICATIONS

Japanese Office Action for corresponding JP Application No. 2018-123257, dated Mar. 26, 2019 (w/ English machine translation).

* cited by examiner

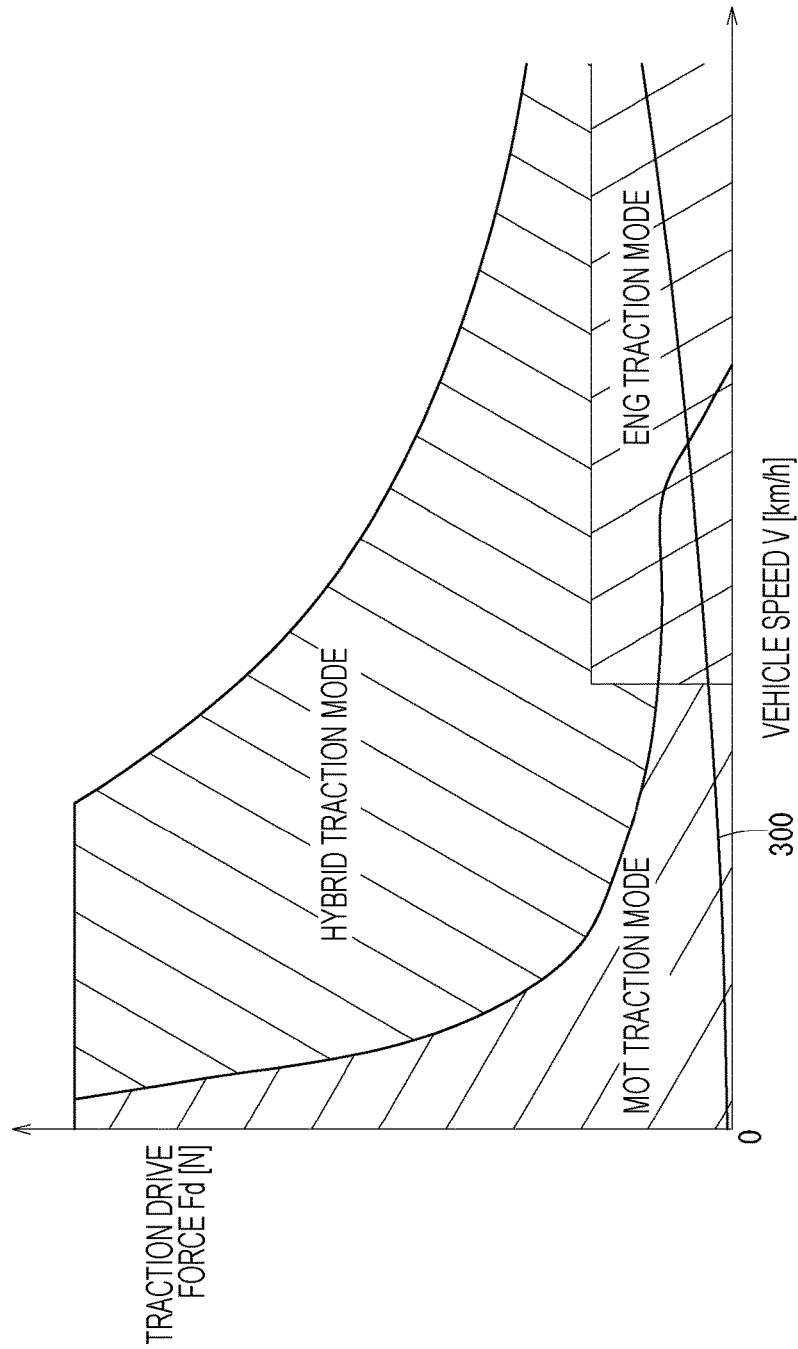

FIG. 4

| TRACTION MODES | CONTROL PATTERNS | EXAMPLES OF USE FOR | ENG CLUTCH | GEN CLUTCH | TRC CLUTCH |
|---|---|---|---|---|---|
| MOT TRACTION MODE (RUN MAINLY BY BEING DRIVEN BY TRC) | PA11 | LOW- AND INTERMEDIATE-SPEED RUNNING | OFF | OFF | ON |
|  | PA12 | LOW-SPEED ACCELERATION | ON | ON | ON |
| HYBRID TRACTION MODE (RUN BY BEING DRIVEN BY TRC USING ELECTRIC POWER WHICH IS GENERATED BY GEN USING ENG POWER) | PA21 | INTERMEDIATE-SPEED ACCELERATION AND HIGH-SPEED SUDDEN ACCELERATION | OFF | ON | ON |
| ENG TRACTION MODE (RUN BY BEING DRIVEN BY ENG) | PA31 | HIGH-SPEED ACCELERATION | ON | OFF | ON |
|  | PA32 | HIGH-SPEED CRUISING | ON | OFF | OFF |
|  | PA33 | BAT CHARGING | ON | ON | OFF |
|  | PA34 | INERTIA RUNNING (WHILE CHARGING BAT) | OFF | ON | OFF |
|  | PA35 | INERTIA RUNNING (WITHOUT CHARGING BAT) | OFF | OFF | OFF |
| REGENERATION MODE | PA41 | DECELERATION | OFF | OFF | ON |

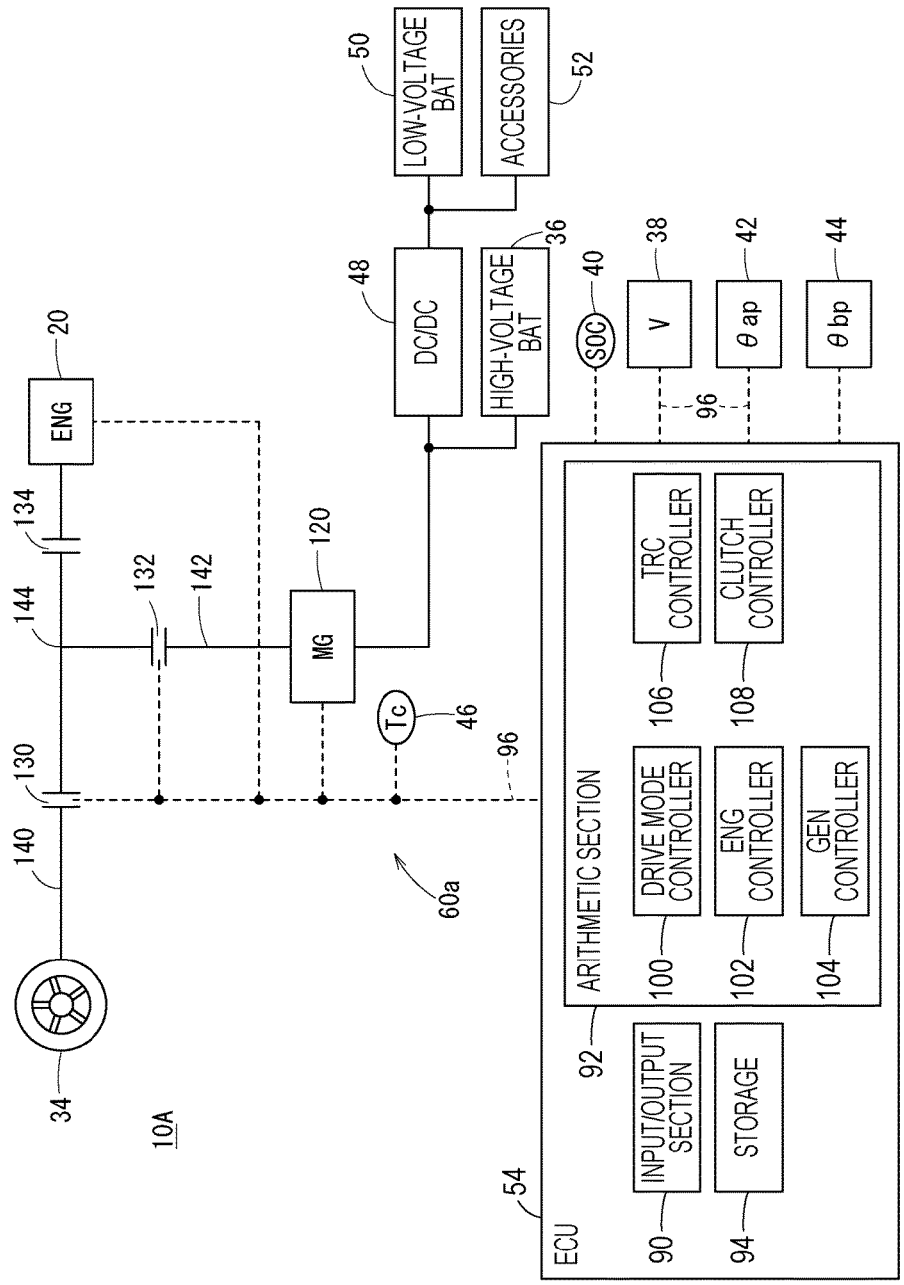

FIG. 11

| TRACTION MODES | CONTROL PATTERNS | EXAMPLES OF USE FOR | COM CLUTCH | MG CLUTCH | ENG CLUTCH |
|---|---|---|---|---|---|
| MOT TRACTION MODE (RUN MAINLY BY BEING DRIVEN BY MG) | PA51 | LOW- AND INTERMEDIATE-SPEED RUNNING | ON | ON (MG: DRIVE) | OFF |
| | PA52 | LOW- AND INTERMEDIATE-SPEED SUDDEN ACCELERATIONS | ON | ON (MG: DRIVE) | ON |
| ENG TRACTION MODE (RUN BY BEING DRIVEN BY ENG) | PA61 | HIGH-SPEED ACCELERATION | ON | ON (MG: DRIVE) | ON |
| | PA62 | HIGH-SPEED CRUISING | ON | OFF | ON |
| | PA63 | BAT CHARGING | ON | ON (MG: GENERATE ELECTRIC POWER) | ON |
| | PA64 | INERTIA RUNNING (WHILE CHARGING BAT) | OFF | ON (MG: GENERATE ELECTRIC POWER) | ON |
| | PA65 | INERTIA RUNNING (WITHOUT CHARGING BAT) | OFF | OFF (OR ON) | OFF (OR ON) |
| REGENERATION MODE | PA71 | DECELERATION | ON | ON (MG: GENERATE ELECTRIC POWER) | OFF |

VEHICLE

CROSS-REFERENCE TO RELATED APPLICATIONS

The present application claims priority under 35 U.S.C. § 119 to Japanese Patent Application No. 2015-235866, filed Dec. 2, 2015, entitled "VEHICLE." The contents of this application are incorporated herein by reference in their entirety.

BACKGROUND

1. Field

The present disclosure relates to a vehicle.

2. Description of the Related Art

According to International Publication No. 2012/053361, its object is to provide a drive apparatus for a hybrid vehicle, capable of suppressing the occurrence of a resonance phenomenon and improving the efficiency of utilization of the space occupied by a torque limiter mechanism (Paragraph [0009] and Abstract).

According to International Publication No. 2012/053361 (Abstract), for achieving the object, the drive apparatus 100A for a hybrid vehicle includes a torque limiter TL which is arranged on a power transmission route connecting an inner circumferential shaft 2a and a generator 60, and between the generator 60 and a motor 70. The torque limiter TL partially overlaps a stator 65 of the generator 60 and/or a stator 75 of the motor 70 in an axial direction.

The torque limiter TL is intended to prevent a generator shaft 2c and the like from being warped and broken by excessive torque which is inputted from the generator 60 to the generator shaft 2c when an engine is started (Paragraphs [0004] to [0006], [0046] and [0047]). Furthermore, the inner circumferential shaft 2a is connected to an engine shaft 1 via a generator drive gear train 10 with a relationship in which the inner circumferential shaft 2a cannot be separated from power transmission from the engine shaft 1 (Paragraph [0021]).

SUMMARY

According to one aspect of the present invention, a vehicle includes an internal combustion engine, a first transmission route, a first switching device, a first rotating electrical machine, a second transmission route, and a control circuit. The first transmission route is configured to transmit power produced by the internal combustion engine to a wheel. The first switching device is arranged on the first transmission route and is configured to be switched between a connecting state which connects the internal combustion engine and the wheel and a disconnecting state which disconnects the internal combustion engine and the wheel. The second transmission route connects a first junction and the first rotating electrical machine. The first junction located on the first transmission route and closer to the internal combustion engine than the first switching device is. The second switching device is arranged on the second transmission route and is configured to be switched between a connecting state which connects the first transmission route and the first rotating electrical machine and a disconnecting state which disconnects the first transmission route and the first rotating electrical machine. The control circuit is configured to control the first switching device and the second switching device. While the power is being transmitted from the internal combustion engine to the wheel with the first switching device in the connecting state, if a vehicle speed of the vehicle becomes greater than a first vehicle speed threshold value, the control circuit performs control to switch the second switching device to the disconnecting state.

According to another aspect of the present invention, a vehicle includes an internal combustion engine, a wheel, a first transmission path, a first clutch, a first rotating electrical machine, a second transmission path, a second clutch, and circuitry. Power produced by the internal combustion engine is to be transmitted to the wheel via the first transmission path. The first clutch is provided in the first transmission path to select a connection state between a first connecting state in which the internal combustion engine and the wheel are connected and a first disconnecting state in which the internal combustion engine and the wheel are disconnected. The first transmission path has a first junction provided between the first clutch and the internal combustion engine. The second transmission path is to connect the first junction to the first rotating electrical machine. The second clutch is provided in the second transmission path to select a connection state between a second connecting state in which the first transmission path and the first rotating electrical machine are connected via the second transmission path and a second disconnecting state in which the first transmission path and the first rotating electrical machine are disconnected. The circuitry is configured to control the first clutch and the second clutch such that the second clutch switches to the second disconnecting state in a case where the first clutch switches to the first connecting state so as to transmit the power from the internal combustion engine to the wheel and where a vehicle speed of the vehicle is larger than a first vehicle speed threshold value.

According to further another aspect of the present invention, a vehicle includes an internal combustion engine, a wheel, a first transmission path, a first clutch, a second rotating electrical machine, a third transmission path, a third clutch, and circuitry. Power produced by the internal combustion engine is to be transmitted to the wheel via the first transmission path. The first clutch is provided in the first transmission path to select a connection state between a first connecting state in which the internal combustion engine and the wheel are connected and a first disconnecting state in which the internal combustion engine and the wheel are disconnected, the first transmission path having a second junction provided between the first clutch and the wheel. The third transmission path is to connect the second junction to the second rotating electrical machine. The third clutch is provided in the third transmission path to select a connection state between a second connecting state in which the first power transmission path and the second rotating electrical machine are connected via the third power transmission path and a second disconnecting state in which the first power transmission path and the second rotating electrical machine are disconnected. The circuitry is configured to control the first clutch and the third clutch such that the third clutch switches to the second disconnecting state in a case where the first clutch switches to the first connecting state so as to transmit the power from the internal combustion engine to the wheel and where a vehicle speed of the vehicle is larger than a first vehicle speed threshold value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a schematic configuration diagram of a vehicle of a first embodiment of the disclosure.

FIG. 3 is a diagram for explaining a method of selecting traction modes which is used in the first embodiment.

FIG. 4 is a diagram showing relationships among the traction modes and first to third clutches in the first embodiment.

FIG. 10 is a schematic configuration diagram of a vehicle of a second embodiment of the disclosure.

FIG. 11 is a diagram showing relationships among traction modes and first to third clutches in the second embodiment.

DESCRIPTION OF THE EMBODIMENTS

Figure 1:
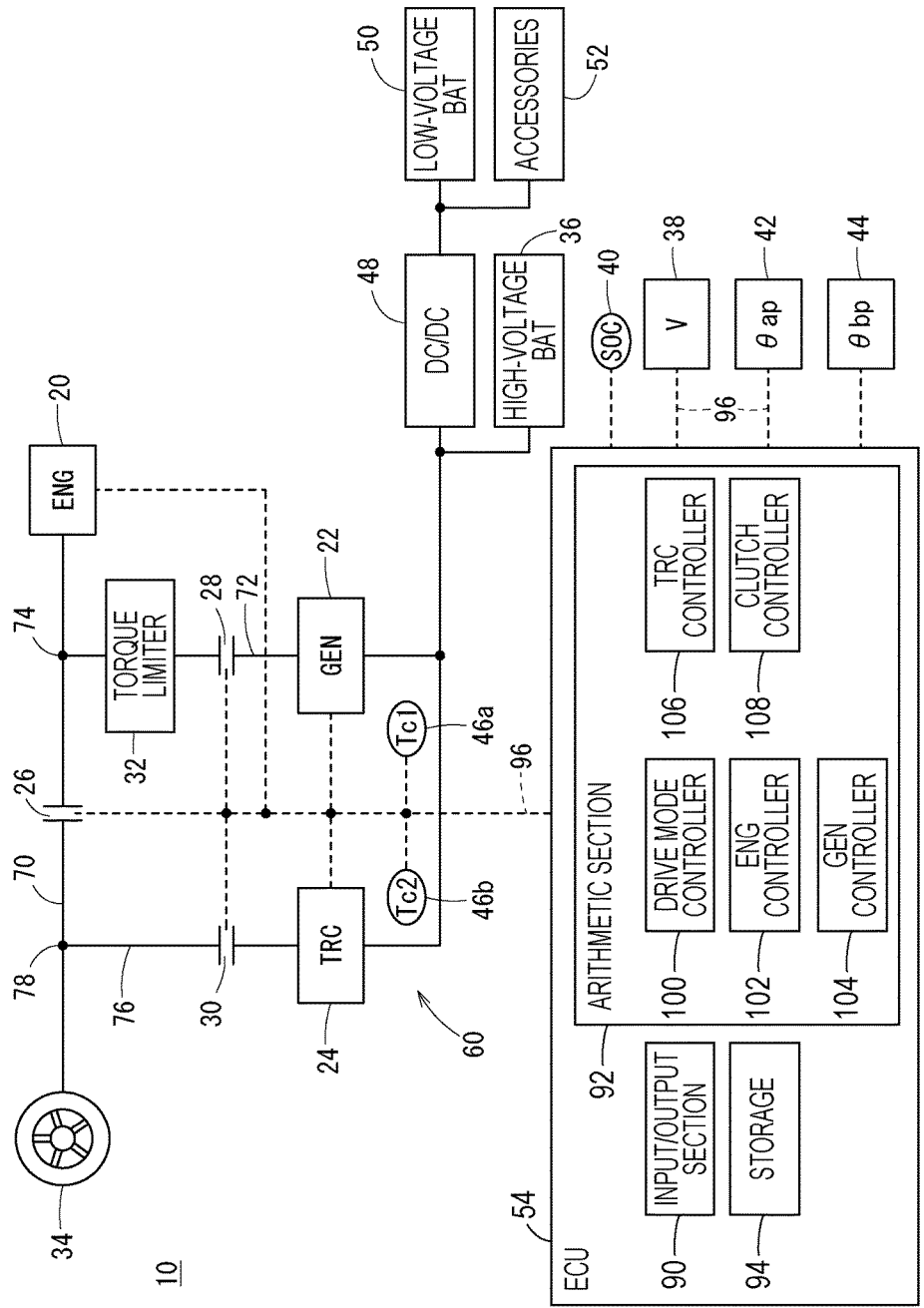

The embodiments will now be described with reference to the accompanying drawings, wherein like reference numerals designate corresponding or identical elements throughout the various drawings.

A. First Embodiment

[A-1. Configuration of Vehicle 10]
<A-1-1. Overall Configuration>

Figure 2:
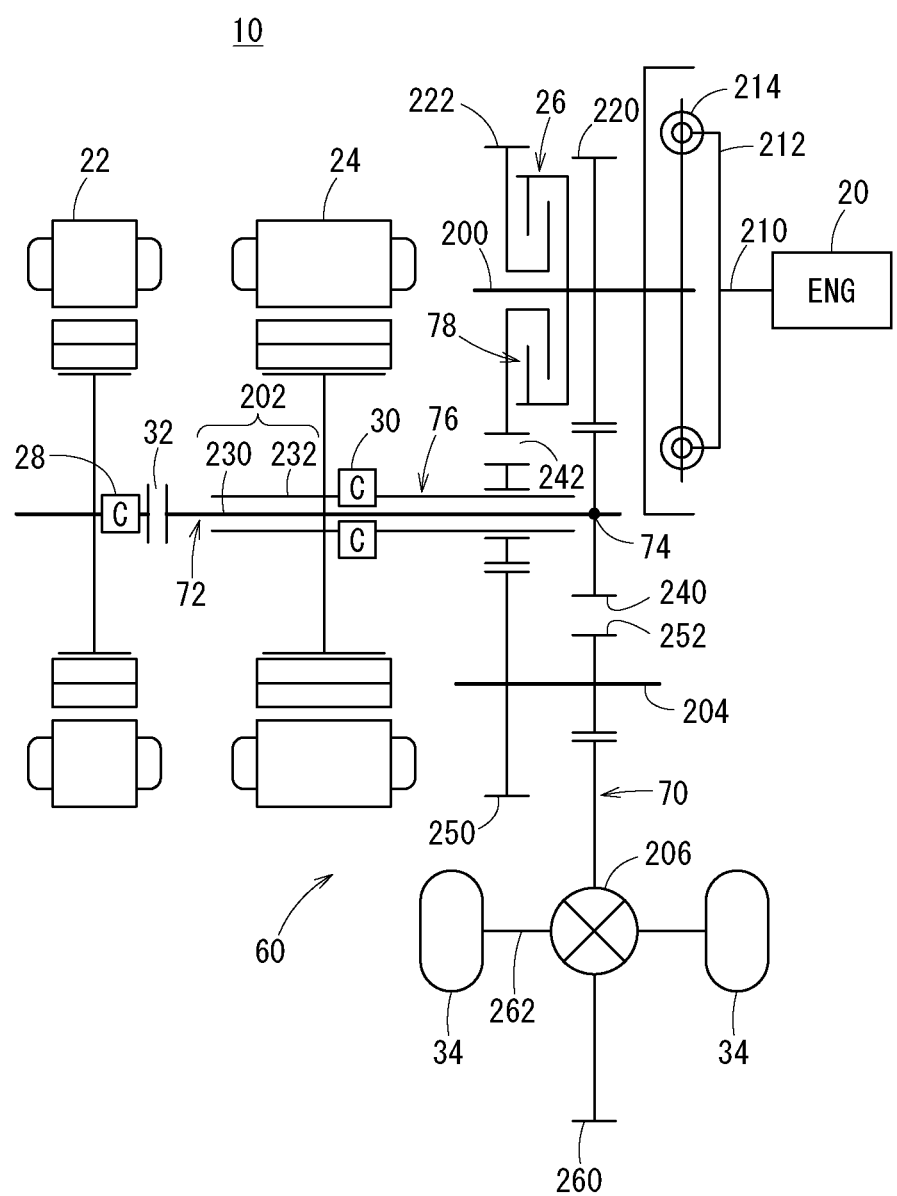
FIG. 2 is a diagram schematically showing a mechanical connecting relationship in a drive line of the first embodiment.

FIG. 1 is a schematic configuration diagram of a vehicle 10 of a first embodiment of the disclosure. FIG. 2 is a diagram schematically showing a mechanical connecting relationship in a drive line of the first embodiment. The vehicle 10 is a so-called hybrid vehicle. The vehicle 10 includes an engine 20, a first rotating electrical machine 22, a second rotating electrical machine 24, a first clutch 26, a second clutch 28, a third clutch 30, a torque limiter 32, wheels 34, a high-voltage battery 36, a vehicle speed sensor 38, a state-of-charge (SOC) sensor 40, an accelerator pedal (AP) operation amount sensor 42, a brake pedal (BP) operation amount sensor 44, temperature sensors 46a, 46b, a step-down converter 48, a low-voltage battery 50, electrically-operated accessories 52, and an electronic control unit 54 (hereinafter referred to as an "ECU 54").

A group of the engine 20, the first rotating electrical machine 22, the second rotating electrical machine 24, the first clutch 26, the second clutch 28 and the third clutch 30 is hereinafter referred to as a "drive line 60." A power transmission route connecting the engine 20 and the wheels 34 is termed a first transmission route (path) 70. The first transmission route 70 transmits power Teng, generated by the engine 20, to the wheels 34. In addition, a power transmission rout connecting a first junction 74 on the first transmission route 70, which is closer to the engine 20 than the first clutch 26 is, and the first rotating electrical machine 22 is termed a second transmission route (path) 72. Furthermore, a power transmission rout connecting a second junction 78 on the first transmission route 70, which is closer to the wheels 34 than the first clutch 26 is, and the second rotating electrical machine 24 is termed a third transmission route (path) 76.

As shown in FIG. 2, configurations of the drive line 60 and the like may be the same as those shown in International Publication No. 2012/053361, except for parts (the second clutch 28 and the like) which are characteristic of the first embodiment. The configuration is described in, for example, International Publication No. 2012/053361, the entire contents of which are incorporated herein by reference.

To put it specifically, the drive line 60 includes an engine shaft 200, a motor generator shaft 202, an output shaft 204 and a differential device 206. The engine 20 is connected to the engine shaft 200 via a crankshaft 210, a drive plate 212 and a damper 214. A first engine shaft gear 220, an ENG clutch 26, and a second engine shaft gear 222 are mounted around the engine shaft 200.

The motor generator shaft 202 includes an inner circumferential shaft 230 and an outer circumferential shaft 232. An inner circumferential shaft gear 240 in engagement with the first engine shaft gear 220 is formed around the inner circumferential shaft 230. Thus, in response to revolutions of the engine shaft 200, the inner circumferential shaft 230 revolves to drive the generator 22. A GEN clutch 28 and the torque limiter 32 are arranged on the inner circumferential shaft 230. It should be noted that regardless of whether or not the ENG clutch 26 is in a connecting state, the inner circumferential shaft 230 is connected to the engine shaft 200.

The outer circumferential shaft 232 of the motor generator shaft 202 is a hollow member arranged around the inner circumferential shaft 230. An outer circumferential shaft gear 242 in engagement with the second engine shaft gear 222 is formed on the outer circumferential shaft 232. The traction motor 24 is connected to the outer circumferential shaft 232.

The output shaft 204 is arranged in parallel with the engine shaft 200 and the motor generator shaft 202. The output shaft 204 is provided with: a first output shaft gear 250 in engagement with the outer circumferential shaft gear 242; and a second output shaft gear 252 in engagement with an output gear 260 of the differential device 206. A differential shaft 262 is linked to the output gear 260.

Thereby, while the ENG clutch 26 is ON (in the connecting state), the vehicle can perform what is termed parallel travel in which the power Teng from the engine 20 and power Ttrc from the traction motor 24 are transmitted to the output shaft 204.

Meanwhile, while the ENG clutch 26 is OFF (in a disconnecting state), the engine shaft 200 is unlinked from the outer circumferential shaft 232 and the output shaft 204. In that case, the power Teng from the engine 20 is transmitted to the generator 22 only. Thus, the vehicle can perform what is termed series travel in which: the power Teng from the engine 20 makes the generator 22 generate electric power; and the electric power thus-generated is supplied to the traction motor 24.

<A-1-2. Engine 20>

As a first drive source for the traction of the vehicle 10, the engine 20 generates the power Teng, and supplies the power Teng to the wheels (driving wheels) 34. In addition, the engine 20 operates the first rotating electrical machine 22 with the power Teng, and thereby makes the first rotating electrical machine 22 generate electric power. "ENG" or "eng" will be hereinbelow added to parameters related to the engine 20. Furthermore, in FIG. 1 and the like, the engine 20 is shortened to "ENG."

<A-1-3. First Rotating Electrical Machine 22>

The first rotating electrical machine 22 is of a three-phase AC brushless type, and functions as the generator which generates the electric power using the power Teng from the engine 20. The electric power Pgen generated by the first rotating electrical machine 22 is supplied to the high-voltage battery 36 (hereinafter referred to as a "battery 36" as well), the second rotating electrical machine 24 or the electrically-operated accessories 52 via a first inverter, albeit not illustrated.

The first rotating electrical machine 22 will be hereinafter referred to as a generator 22 as well. The first rotating electrical machine 22 may be made to function as a traction motor in addition to or in lieu of functioning as the generator. "GEN" or "gen" will be hereinbelow added to parameters related to the generator 22. Furthermore, in FIG. 1 and the like, the generator 22 is shortened to "GEN." The generator 22 can be used as a starter motor for the engine 20.

<A-1-4. Second Rotating Electrical Machine 24>

The second rotating electrical machine 24 is of a three-phase AC brushless type. As a second drive source for the traction of the vehicle 10, the second rotating electrical machine 24 generates the power Ttrc, and supplies the power Ttrc to the wheels 34 (the driving wheels). To put it specifically, the second rotating electrical machine 24 functions as the traction motor to be driven using either or both of electric power Pbat from the high-voltage battery 36 and electric power Pgen from the generator 22. When the vehicle 10 is braked, the second rotating electrical machine 24 functions as a regenerative brake, and thus supplies regenerative electric power Preg to the battery 36 via a second inverter, albeit not illustrated. The regenerative electric power Preg may be supplied to the electrically-operated accessories 52.

The second rotating electrical machine 24 will be hereinafter referred to as a traction motor 22 as well. The second rotating electrical machine 24 may be made to function as a generator in addition to or in lieu of functioning as the traction motor. "TRC" or "trc" will be hereinbelow added to parameters related to the traction motor 24. Furthermore, in FIG. 1 and the like, the traction motor 24 is shortened to "TRC."

<A-1-5. First Clutch 26, Second Clutch 28, and Third Clutch 30>

The first clutch 26 (first switching device) is arranged on the first transmission route 70. The first clutch 26 is switched between a connecting state which connects the engine 20 and the wheels 34 and a disconnecting state which disconnects the engine 20 and the wheels 34, based on instructions from the ECU 54. The first clutch 26 will be hereinafter referred to as the ENG clutch 26 or a COM clutch 26 as well. In this respect, "COM" means the first clutch 26 is a clutch "common" to the engine 20 and the generator 22.

The second clutch 28 (second switching device) is arranged on the second transmission route 72. The second clutch 28 is switched between a connecting state which connects the first transmission route 70 and the generator 22 and a disconnecting state which disconnects the first transmission route 70 and the generator 22, based on instructions from the ECU 54. The second clutch 28 will be hereinafter referred to as the GEN clutch 28 as well.

The third clutch 30 (third switching device) is arranged on the third transmission route 76. The third clutch 30 is switched between a connecting state which connects the first transmission route 70 and the traction motor 24 and a disconnecting state which disconnects the first transmission route 70 and the traction motor 24, based on instructions from the ECU 54. The third clutch 30 will be hereinafter referred to as a TRC clutch 30 as well.

<A-1-6. Torque Limiter 32>

The torque limiter 32 is installed between the GEN clutch 28 and the first junction 74, and prevents excessive torque from being transmitted from the generator 22 to the engine 20, or from the engine 20 to the generator 22. The torque limiter 32 may be installed between the generator 22 and the GEN clutch 28.

<A-1-7. High-Voltage Battery 36>

The high-voltage battery 36 is an energy storage including multiple battery cells, and being capable of outputting high voltage (hundreds of volts). For example, a lithium ion rechargeable battery, a nickel hydrogen rechargeable battery, or the like may be used as the high-voltage battery 36. In addition to or in lieu of the battery 36, an energy storage, such as a capacitor, may be used as the high-voltage battery 36.

<A-1-8. Sensors>

The vehicle speed sensor 38 detects a vehicle speed V [km/h] of the vehicle 10, and sends it to the ECU 54. A SOC sensor 40 is made up from an electric current senor and the like, albeit not illustrated. The SOC sensor 40 detects the state of charge (SOC) of the battery 36, and sends it to the ECU 54.

The AP operation amount sensor 42 detects an amount of depression of the acceleration pedal, albeit not illustrated, from the initial position (AP operation amount θap [deg] or [%], and sends it to the ECU 54. The BP operation amount sensor 44 detects an amount of depression of the brake pedal, albeit not illustrated, from the initial position (BP operation amount θbp [deg] or [%], and sends it to the ECU 54.

The temperature sensor 46a detects a temperature Tc1 [°] of a coil (albeit not illustrated) of the generator 22 (hereinafter referred to a "coil temperature Tc1" as well), and sends it to the ECU 54. The temperature sensor 46b detects a temperature Tc2 [°] of a coil (albeit not illustrated) of the traction motor 24 (hereinafter referred to a "coil temperature Tc2" as well), and sends it to the ECU 54.

<A-1-9. Step-Down Converter 48, Low-Voltage Battery 50 and Electrically-Operated Accessories 52>

The step-down converter 48 steps down a battery voltage Vbat, a generated voltage Vgen or the regenerative voltage Vreg, and supplies it to the electrically-operated accessories 52. The battery voltage Vbat is an output voltage from the battery 36. The generated voltage Vgen is an output voltage from the generator 22 as generating electric power. The regenerative voltage Vreg is an output voltage from the traction motor 24 as functioning as the regenerative brake.

The electrically-operated accessories 52 include lamps, an air conditioner, a navigator, for example.

<A-1-10. ECU 54>

The ECU 54 is a control circuit (or a control device) configured to control the entirety of the transmission line 60, and includes an input/output section 90, an arithmetic section 92 and a storage 94. The input/output section 90 receives and outputs signals from and to components of the vehicle 10 via signal lines 96 (communication lines). The input/output section 90 includes an analog-to digital (A/D) converter, albeit not illustrated, configured to convert received analog signals into digital signals.

The arithmetic section 92 operates by executing programs stored in the storage 94. The programs may be supplied from the outside via a radio communication apparatus (a cellular phone, a smart phone or the like). Parts of the programs may be made from hardware (circuit components).

As shown in FIG. 1, the arithmetic section 92 includes a drive mode controller 100, an engine controller 102, a generator controller 104, a traction motor controller 106 and a clutch controller 108.

The drive mode controller 100 controls the drive modes of the vehicle 10. The drive modes include: a drive mode using the engine 20; a drive mode using the traction motor 24; and a drive mode using the engine 20 and the traction motor 24. When the drive mode controller 100 controls the drive modes, the drive mode controller 100 simultaneously controls the power generation by the generator 22 and the regeneration (power generation) by the traction motor 24. Referring to FIGS. 3 and 4, detailed descriptions will be hereinbelow provided for how the drive mode controller controls the drive modes.

The engine controller 102 (hereinafter referred to as an "ENG controller 102" as well) controls the engine 20 based on instructions from the drive mode controller 100. The generator controller 104 (hereinafter referred to as a "GEN controller 104" as well) controls the generator 22 based on instructions from the drive mode controller 100. The traction motor controller 106 (hereinafter referred to as a "TRC controller 106" as well) controls the traction motor 24 based on instructions from the drive mode controller 100. The clutch controller 108 controls the first to third clutches 26, 28, 30 based on instructions from the drive mode controller 100.

The storage 94 includes: a RAM (Random Access Memory) for storing signals converted into digital signals, temporary date to be supplied for arithmetic processes, and the like; and a ROM (Read Only Memory) for storing execution programs, tables, maps, and the like.

[A-2. Traction Modes]

<A-2-1. Outline>

FIG. 3 is a diagram for explaining a method of selecting traction modes which is used in the first embodiment. FIG. 4 is a diagram showing relationships among the traction modes and the first to third clutches 26, 28, 30 in the first embodiment. As shown in FIGS. 3 and 4, the first embodiment uses a motor (MOT) traction mode, a hybrid traction mode, an ENG traction mode and a regeneration mode. As shown in FIG. 3, the MOT traction mode, the hybrid traction mode and the ENG traction mode are selected mainly depending on the vehicle speed V and a traction drive force Fd of the vehicle 10. The traction drive force Fd may be provided as any one of an actually-measure value, an estimated value and a required value. In a case where the traction drive force Fd is provided as the required value, the ECU 54 calculated the traction drive force Fd using the vehicle speed V, the AP operation amount θap, the BP operation amount θbp and the like.

FIG. 3 shows a running resistance line 300. The traction resistance line 300 represents a resistance Rt to the vehicle 10 from a type of road (for example, a flat asphalt road) on which the vehicle 10 is running. While the acceleration of the vehicle 10 by the traction drive force Fd and the deceleration of the vehicle 10 by the running resistance Rt is in equilibrium, the vehicle 10 runs at constant speed. In other words, constant-speed running of the vehicle 10 at a specific vehicle speed V can be achieve when the vehicle 10 runs using the traction drive force Fd which corresponds to the specific vehicle speed V on the running resistance line 300.

<A-2-2. MOT Traction Mode>

The MOT traction mode is a mode used to make the traction motor 24 drive the vehicle 10 mainly using the electric power from the high-voltage battery 36. FIGS. 3 and 4, the MOT traction mode is used for low-speed or intermediate-speed running. Furthermore, the MOT traction mode includes control patterns PA11, PA12.

In the control pattern PA11, the ENG clutch 26 and the GEN clutch 28 are switched to the disconnecting state (OFF), while the TRC clutch 30 is switched to the connecting state (ON). The control pattern PA11 is used for the low-speed or intermediate-speed running, for example. In the control pattern PA12, the ENG clutch 26, the GEN clutch 28 and the TRC clutch 30 are ON. The control pattern PA12 is used for low-speed acceleration, for example. In this case, because in addition to the power Ttrc from the traction motor 24 and the power Teng from the engine 20, the power Tgen from the generator 22 is used to drive the vehicle 10, very large vehicle driving force can be generated. Incidentally, the control pattern PA12 may be considered as belonging to the ENG traction mode.

In this respect, the low speed is a speed within a range which is greater than 0 km/h but less than a value between 10 km/h and 20 km/h, for example. Meanwhile, the intermediate speed is a speed within a range which is greater than the upper limit value of the slow speed but less than a value between 60 km/h and 120 km/h, for example. Moreover, a high speed, although described later, is a speed within a range which is greater than the upper limit value of the intermediate speed but less than the upper limit value of the vehicle speed of the vehicle 10.

<A-2-3. Hybrid Traction Mode>

The hybrid traction mode is a mode used to make the traction motor 24 drive the vehicle 10 using electric power which is generated by the generator 22 using the power Teng from the engine 20. As shown in FIGS. 3 and 4, the hybrid traction mode is used for intermediate-speed acceleration and high-speed sudden acceleration. The hybrid traction mode includes the control pattern PA21. In the control pattern PA21, the ENG clutch 26 (the COM clutch 26) is OFF, while the GEN clutch 28 and the TRC clutch 30 are ON. Thereby, the engine 20 is linked to the generator 22, but unlinked form the wheels 34.

<A-2-4. ENG Traction Mode>

The ENG traction mode is a mode used to make the vehicle 10 runs using the engine 20 as the main drive source. As shown in FIGS. 3 and 4, the ENG traction mode is used for high-speed acceleration, high-speed cruising, battery charging, inertia running (while charging the battery) and inertia running (without charging the battery). As shown in FIG. 4, the ENG traction mode includes control patterns PA 31 to PA 35.

In the control pattern PA 31, the ENG clutch 26 and the TRC clutch 30 are ON, while the GEN clutch 28 is OFF. Thereby, the vehicle 10 can perform the high-speed acceleration, for example.

In the control pattern PA 32, the ENG clutch 26 is ON, while the GEN clutch 28 and the TRC clutch 30 are OFF. Thereby, the vehicle 10 can cruise at high-speed (which will be later described referring to FIGS. 5 and 6), for example. The high-speed cruising may be performed at a speed within a range which is greater than the upper limit value of the intermediate speed but less than the upper limit value of the vehicle speed of the vehicle 10, or at a speed within only some speed range. Incidentally, a run at the vehicle speed V which is constant, and a run at the vehicle speed V which changes within a predetermined range are defined as being included in the cruising (for which further descriptions will be later referring to FIG. 7 and the like).

In the control pattern PA 33, the ENG clutch 26 and the GEN clutch 28 are ON, while the TRC clutch 30 are OFF. Thereby, the vehicle 10 can do things such as the charging of the high-voltage battery 36, for example.

In the control pattern PA 34, the ENG clutch 26 and the TRC clutch 30 are OFF, while the GEN clutch 28 is ON. Thereby, for example, during the inertia running, the vehicle 10 can do things, such as the charging of the high-voltage battery 36, by causing the generator 22 to generate electric power using the power Teng from the engine 20.

In the control pattern PA 35, the ENG clutch 26, the GEN clutch 28 and the TRC clutch 30 are OFF. Thereby, it is possible to improve the driving efficiency (or the actual fuel mileage) of the vehicle 10 by allowing the vehicle 10 to run by inertia without the generator 22 or the traction motor 24 generating electric power.

<A-2-5. Regeneration Mode>

The regeneration mode is a mode used to decelerate the vehicle 10. As shown in FIG. 4, the regeneration mode includes a control pattern PA41. In the control pattern PA41, the ENG clutch 26 and the GEN clutch 28 are OFF, while the TRC clutch 30 is OFF. Thereby, the regeneration by the traction motor 24 makes it possible to do things such as the charging of the high-voltage battery 36.

[A-3. Control in First Embodiment]

<A-3-1. Switching of Drive Modes>

(A-3-1-1. Outline)

As described above, in the first embodiment, the ECU 54 switches the drive modes of the vehicle 10 depending on the vehicle speed V and the traction drive force Fd of the vehicle 10 (FIGS. 3 and 4).

(A-3-1-2. High-Speed Cruise Control)

Next, descriptions will be provided for a high-speed cruise control to be performed by the ECU 54 to make the vehicle 10 cruise at high-speed. The high-speed cruise control is a control for selectively using the control patterns PA32, PA34 (FIG. 4) under the ENG traction mode. The control pattern PA35 may be used in addition to or in lieu of the control patterns PA32, PA34.

Figure 5:
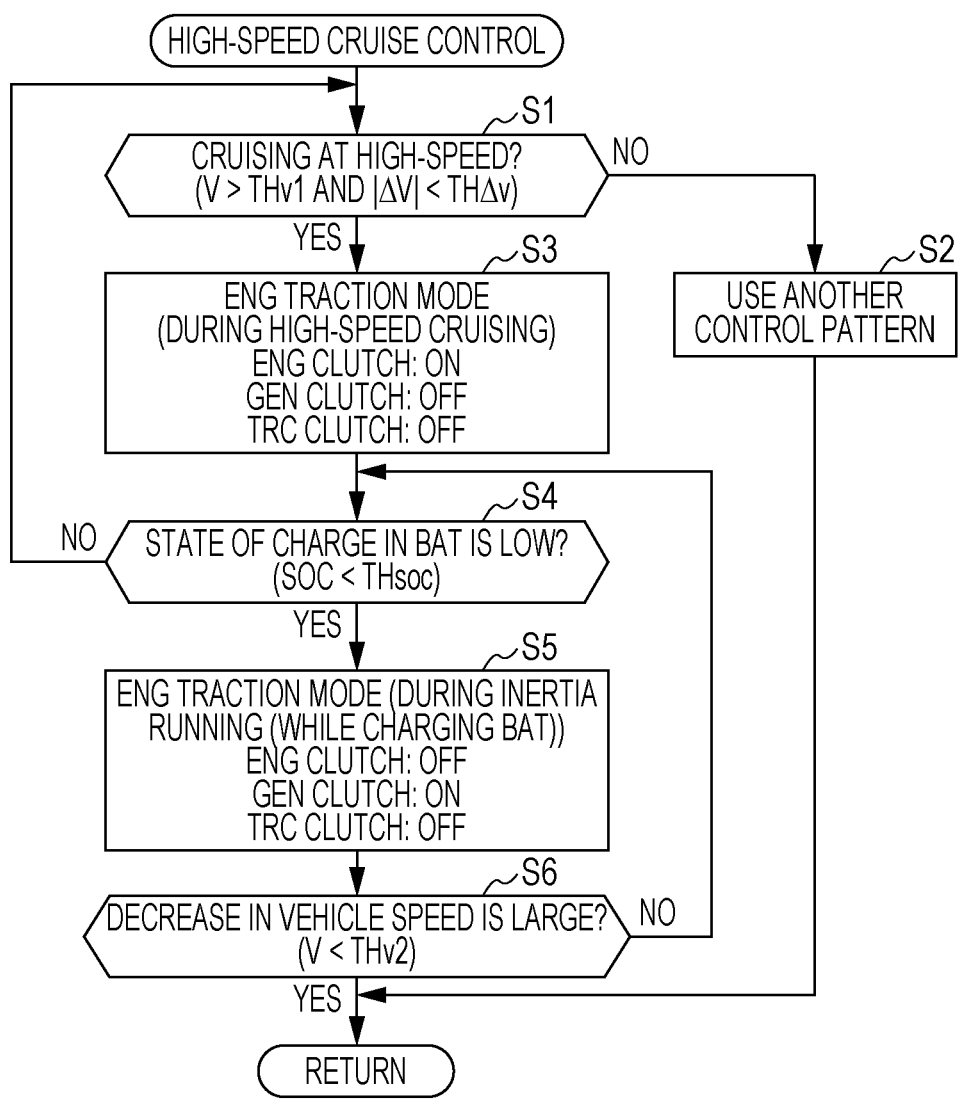
FIG. 5 is a flowchart of a high-speed cruise control in the first embodiment.
Figure 6:
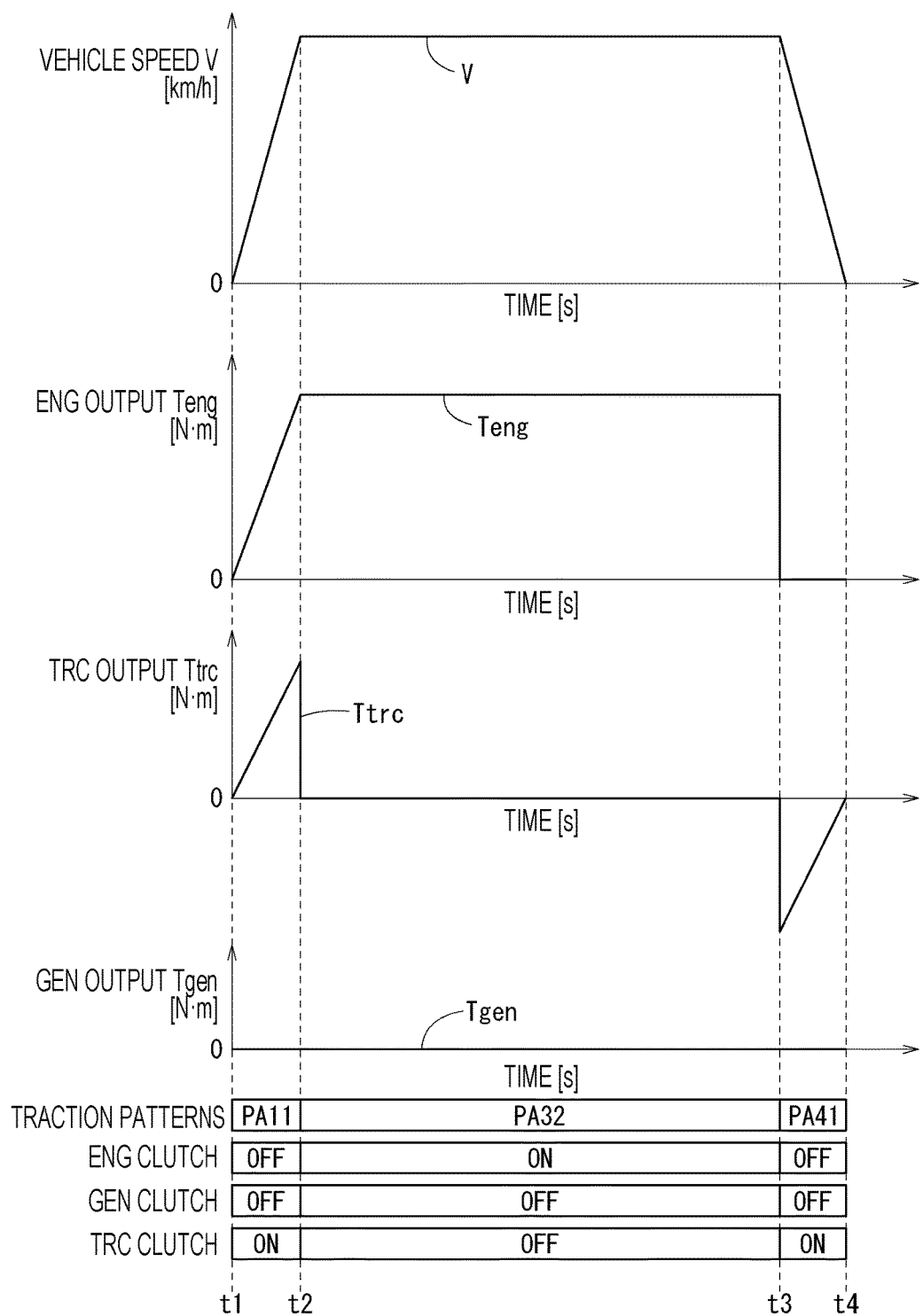
FIG. 6 is a diagram showing a first example of relationships among parameters of the high-speed cruise control and operations of the first to third clutches in the first embodiment.
Figure 7:
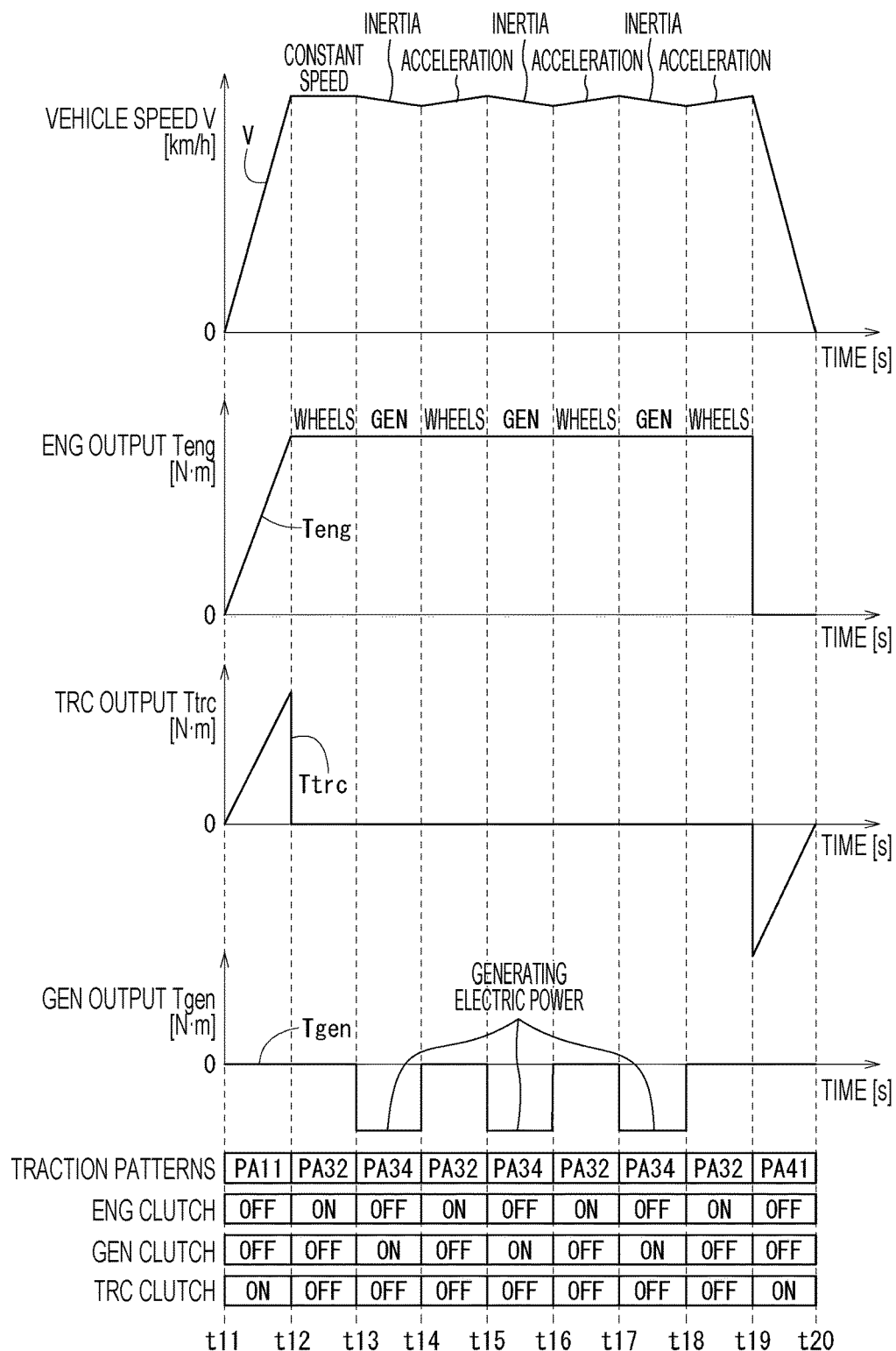
FIG. 7 is a diagram showing a second example of relationships among the parameters of the high-speed cruise control and the operations of the first to third clutches in the first embodiment.

FIG. 5 is a flowchart of the high-speed cruise control in the first embodiment. FIGS. 6 and 7 are diagrams showing first and second examples of relationships among the parameters of the high-speed cruise control and the operations of the first to third clutches 26, 28, 30 in the first embodiment.

The parameters shown in FIGS. 6 and 7 are the vehicle speed V, the output from the engine 20 (ENG output Teng), the output from the generator 22 (GEN output Tgen) and the output from the traction motor 24 (TRC output Ttrc).

In FIG. 7, "WHEELS" and "GEN" shown with the ENG OUTPUT Teng represents where the ENG OUTPUT Teng is transmitted to. To put it specifically, at a timing corresponding to "WHEELS" (for example, at a timing from time t12 to time t13), the ENG OUTPUT Teng (Power Teng) is transmitted to the wheels 34. At a timing corresponding to "GEN" (for example, at a timing from time t13 to time t14), the ENG OUTPUT Teng (Power Teng) is transmitted to the generator 22.

The high-speed cruise control is basically performed by the drive mode controller 100. To this end, the drive mode controller 100 selectively sends instructions to the ENG controller 102, the GEN controller 104, the TRC controller 106 and the clutch controller 108 depending on operations to be requested for the operation objects (the engine 20, the generator 22 and the like).

In step S1 in FIG. 1, the ECU 54 determines whether or not the vehicle is cruising at high speed. This determination is made using: the vehicle speed V; and an absolute value |ΔV| of the time derivative value of the vehicle speed V (hereinafter referred to as an "acceleration ΔV"). To put it specifically, the ECU 54 determines that the vehicle 10 is cruising at high speed if: the vehicle speed V is greater than a first vehicle speed threshold value THv1; and the absolute value |ΔV| is less than an acceleration threshold value THΔv. In addition, the ECU 54 determines that the vehicle 10 is not cruising at high speed if the vehicle speed V is not greater than the first vehicle speed threshold value THv1, or if the absolute value |ΔV| is not less than an acceleration threshold value THΔv.

It should be noted that the determination of whether or not the vehicle 10 is cruising at high speed may be made using another criterion, like the ECU 54 determines that the vehicle 10 is cruising at high speed if: the vehicle speed V is greater than the first vehicle speed threshold value THv1; and the vehicle speed V is within a predetermined speed range for a predetermined length of time.

If the vehicle 10 is not cruising at high speed (NO in step S1), the ECU 54 uses another control pattern depending on the vehicle speed V, the traction drive force Fd and the like in step S2. If the vehicle 10 is cruising at high speed (YES in step S1), the ECU 54 proceeds to step S3.

In step S3, the ECU 54 selects the control pattern PA32 under the ENG traction mode. To put it specifically, the ECU 54 turns the ENG clutch 26 ON, the GEN clutch 28 OFF, and the TRC clutch 30 OFF while operating the engine 20 (see FIG. 6).

In FIG. 6, from time t1 to time t2, the vehicle 10 accelerates using the control pattern PA11 under the MOT traction mode (and may use the control pattern PA12 or the like in addition). Thereafter, from time t2 to time t3, the vehicle 10 cruises at high speed using the control pattern PA 32 under the ENG traction mode. After that, from time t3 to time t4, the vehicle 10 decelerates using the control pattern PA41 under the regeneration mode.

Returning to FIG. 5, in step S4, the ECU 54 determines whether or not the state of charge (SOC) in the high-voltage battery 36 is low. To put it specifically, the ECU 54 determines whether or not the SOC from the SOC sensor 40 is less than an SOC threshold value THsoc. If the SOC is not low (NO in step S4), the ECU 54 returns to step S1. Thereby, step S3 is repeatedly performed. If the SOC is low (YES in step S4), the ECU 54 proceeds to step S5.

In step S5, the ECU 54 selects the control pattern PA34 under the ENG traction mode. To put it specifically, the ECU 54 turns the ENG clutch 26 OFF, the GEN clutch 28 ON, and the TRC clutch 30 OFF while operating the engine 20 (see the clutches from time t13 to time t14, from time t15 to time t16, and from time t17 to time t18 in FIG. 7). Thereby, while the vehicle 10 is running by inertia, the generator 22 can generate electric power using the power Teng from the engine 20 so that the high-voltage battery 36 is charged. Incidentally, fuel injection into the engine 20 may be suspended for all or part of the time step S5 is being executed. In addition to this, the GEN clutch 28 may be temporarily turned OFF so that the generator 22 generates electric power by its inertial force alone.

In step S6 in FIG. 5, the ECU 54 determines whether or not a decrease in the vehicle speed V is large. To put it specifically, the ECU 54 determines whether or not the vehicle speed V is less than a second vehicle speed threshold value THv2. The second vehicle speed threshold value THv2 is set less than the first vehicle speed threshold value THv1. If the decrease in the vehicle speed V is not large (NO in step S6), the ECU 54 returns to step S4. If the decrease in the vehicle speed V is large (YES in step S6), the ECU 54 terminates the current process, and returns to step S1. Accordingly, if the state of charge in the battery 36 is low (YES in step 4), the ECU 54 repeats steps S3, S5 (see the clutches from time t12 to time t19 in FIG. 7).

In FIG. 7, from time t11 to time t12, the vehicle 10 accelerates using the control pattern PA11 under the MOT traction mode (and may use the control pattern PA12 or the like in lieu of or in addition to the control pattern PA11). Thereafter, the vehicle 10 cruises at high speed alternately using the control pattern PA32 (in step S3 in FIG. 5) and the control pattern PA34 (in step S5 in FIG. 5) under the ENG traction mode. After that, from time t19 to time 20, the vehicle 10 decelerates using the control pattern PA41 under the regeneration mode.

As learned from above, the high-speed cruise control of the first embodiment is designed such that if the state of charge in the high-voltage voltage 36 is low (YES in step S4), the generator 22 generates electric power to charge the battery 36 while the vehicle 10 continues cruising at high speed. To this end, the inertia running of the vehicle 10 in step S5 is continued only for a length of time short enough not to allow the driver to feel something different. For this reason, the second vehicle speed threshold value THv2 is set at a value corresponding to the decrease in the vehicle speed V which is small enough not to allow the driver to feel something different.

For example, in a case where the first vehicle speed threshold value THv1 is set at a value within a range of 100 km/h to 180 km/h, the second vehicle speed threshold value THv2 is set at a value which is lower than the first vehicle speed threshold value THv1 by a predetermined value (a value within a range of 5 km/h to 15 km/h, for example). Otherwise, the second vehicle speed threshold value THv2 may be set at a value which is a predetermined percentage (a percentage within a range of 93% to 98%) of the first vehicle speed threshold value THv1.

<A-3-2. Overheat Inhibiting Control for Generator 22 and Traction Motor 24>

Next, descriptions will be provided for how control is performed to inhibit overheat of the generator 22 and the traction motor 24. The overheat inhibiting control is control for inhibiting coils (not illustrated) and the like of the generator 22 and the traction motor 24 from overheating. In addition to the coils, components which need to be inhibited from overheating are magnets, yokes, gears, oil, bearings, inverters (IGBT chips and the like), for example.

Figure 8:
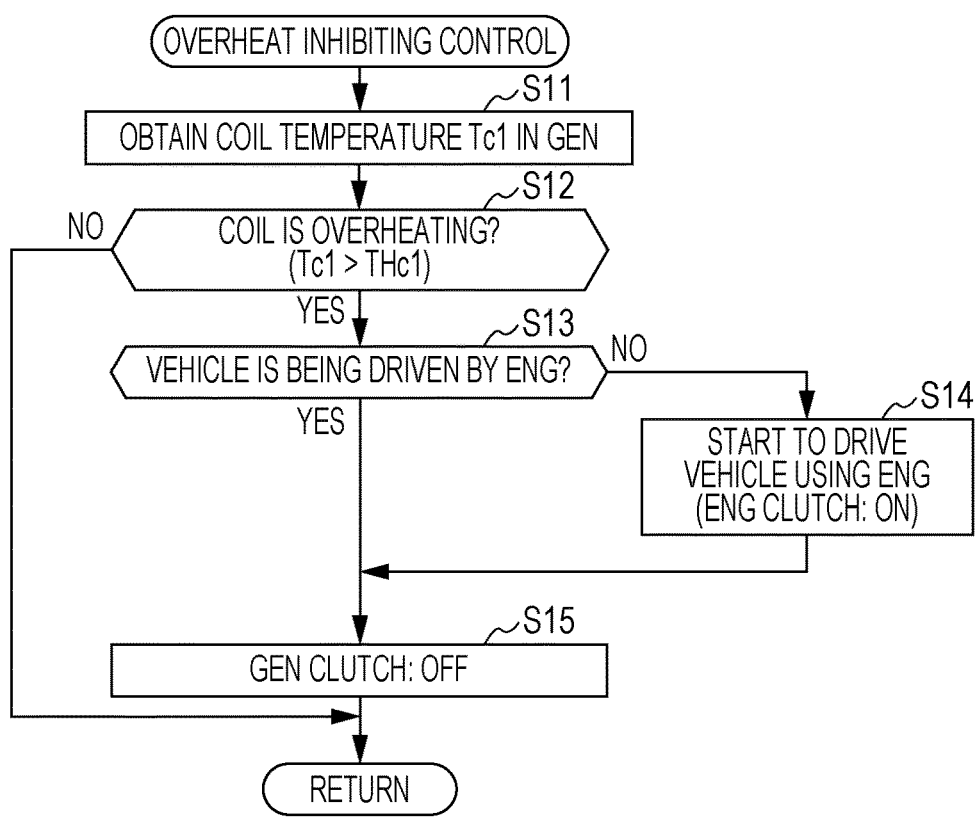
FIG. 8 is a flowchart for overheat inhibiting control in the first embodiment.

FIG. 8 is a flowchart for the overheat inhibiting control in the first embodiment. FIG. 8 shows how control is performed to inhibit the generator 22 from overheating. Similarly, control can be performed to inhibit the traction motor 24 from overheating. Although in this case, the control is intended to be performed to inhibit the generator 22 from overheating, the temperatures of other components which need to be inhibited from overheating may be monitored in the same manner as is the temperature of the coil.

The overheat inhibiting control is basically performed by the drive mode controller 100. To this end, the drive mode controller 100 selectively sends instructions to the ENG controller 102, the GEN controller 104, the TRC controller 106 and the clutch controller 108 depending on operations to be requested for the operation objects (the engine 20, the generator 22 and the like).

In step S11 in FIG. 8, the ECU 54 obtains the coil temperature $Tc1$ of the generator 22 from the temperature sensor 46a. In step S12, the ECU 54 determines whether or not the coil is overheating. To put it specifically, the ECU 54 determines whether or not the coil temperature $Tc1$ is greater than a temperature threshold value $THc1$. If the coil is not overheating (NO in step S12), the ECU 54 terminates the current process, and repeats the processes from step S11 to step S12 after a predetermined length of time elapses. If the coil is overheating (YES in step S12), the ECU 54 proceeds to step S13.

In step S13, the ECU 54 determines whether or not the vehicle 10 is being driven by the engine 20. If the vehicle 10 is not being driven by the engine 20 (NO in step S13), the ECU 54 starts to drive the vehicle 10 using the engine 20 in step S14.

If the vehicle 10 is being driven by the engine 20 (YES in step S13), or after step S14, the ECU 54 turns off the GEN clutch 28 in step S15. Thereby, the generator 22 is disconnected from the first transmission route 70.

<A-3-3. Comparison with Comparative Example>

Next, let us compare the first embodiment with a comparative example. The comparative example does not include the GEN clutch 28 or the TRC clutch 30. Furthermore, the comparative example performs the overheat inhibiting control in the same manner as is shown in FIG. 8. However, since the comparative example does not include the GEN clutch 28 or the TRC clutch 30, a restriction is imposed on the traction drive force Fd of the vehicle 10 (in this case, the required value) instead of step S15 being executed.

Figure 9:
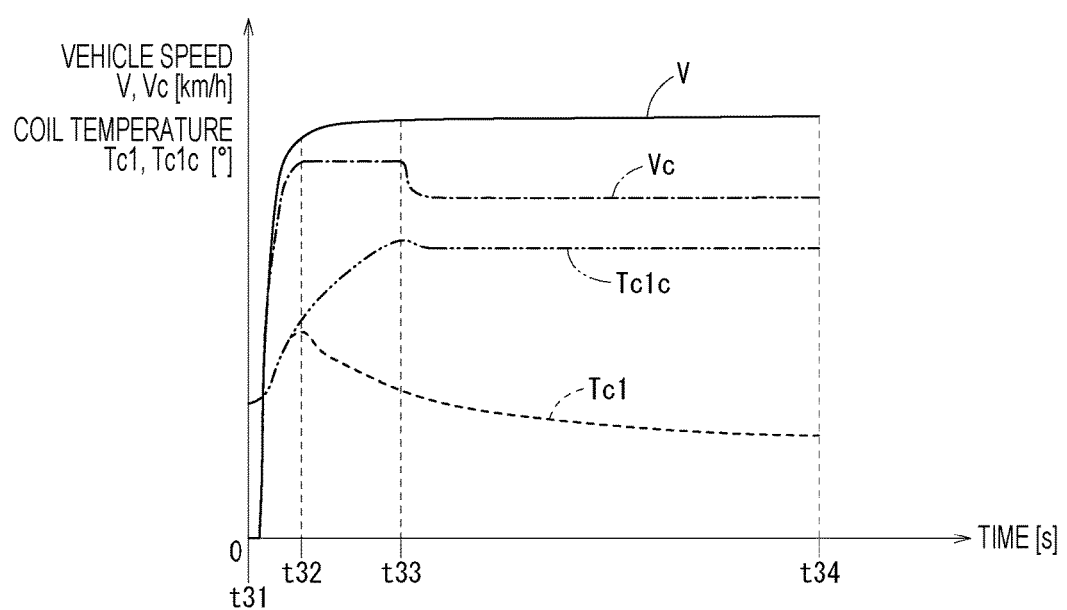
FIG. 9 is a diagram comparison of a vehicle speed and a coil temperature between the first embodiment and the comparative example.

FIG. 9 is a diagram comparison of the vehicle speed V and the coil temperature $Tc1$ between the first embodiment and the comparative example. In FIG. 9, the vehicle speed V of the comparative example is denoted by reference sign Vc, and the coil temperature $Tc1$ of the comparative example is denoted by reference sign $Tc1c$. In the first embodiment, the vehicle 10 suddenly accelerates sequentially using the control patterns PA12, PA21 under the MOT traction mode from time t31 to time t32 in FIG. 9 (the vehicle 10 may accelerate using other control patterns instead of the control patterns PA12, PA21). To put it specifically, after driven by the traction motor 24 alone, the vehicle 10 is drive by the engine 20 and the traction motor 24 while electric power is generated by the generator 22. This is the case with the comparative example as well. Thus, the vehicle speed V, Vc and the coil temperatures Tc1, Tc1c rise in the first embodiment and the comparative example, respectively.

In the first embodiment, from time t32 to time t34, the vehicle 10 is to cruise at high speed using the control pattern PA32 under the ENG traction mode. To put it specifically, the ECU 54 disconnects the generator 22 and the traction motor 24 from the first transmission route 70 by turning off the GEN clutch 28 and the TRC clutch 30, and in turn drives the vehicle 10 using the engine 20. Accordingly, the first embodiment can lower the coil temperature Tc1 while keeping the vehicle speed V high.

In the comparative example, from time t32 to time t34, the vehicle 10 is driven by the engine 20, like in the first embodiment. Since the comparative example does not include the GEN clutch 28 or the TRC clutch 30, the comparative example cannot disconnect the generator 22 or the traction motor 24 from the first transmission route 70. Thus, in the comparative example, the generator 22 and the traction motor 24 inevitably rotate in response to the drive of the engine 20. Accordingly, the highest value of the vehicle speed V of the comparative example becomes lower than the highest value of the vehicle speed V of the first embodiment, while the coil temperature Tc1c of the comparative example continues rising unlike the coil temperature Tc1 of the first embodiment. As a result, at time t33, the traction drive force Fd (the required value) and the output from the engine 20 of the comparative example are restricted by the overheat inhibiting control, and the vehicle speed V is accordingly reduced.

<A-4. Effects of First Embodiment>

According to the first embodiment, if the vehicle speed V becomes greater the first vehicle speed threshold value THv1 while the power Teng is being transmitted from the engine 20 (the internal combustion engine) to the wheels 34 (YES in step S1 in FIG. 5), the ECU performs control to switch the GEN clutch 28 (the second switching device) to the disconnecting state (in step S3). Thereby, if electric power need not be generated by the generator 22 (the first rotating electrical machine), the generator 22 is disconnected from the engine 20. This makes it possible to enhance the fuel efficiency of the vehicle 10.

In addition, if the vehicle 10 is driven at high speed using the power Teng of the engine 20, the generator 22 (the first rotating electrical machine) is disconnected from the first transmission route 70. This makes it possible to inhibit heat generation caused by eddy current produced by the generator 22 which would otherwise rotate using the power Teng from the engine 20 (FIG. 9). Accordingly, other measure for preventing the overheating of the generator 22 (for example, the restriction to be imposed on the output of the engine 20 (in the comparative example in FIG. 9)) becomes no longer necessary. Thus, it is possible to inhibit a decrease in marketability of the vehicle 10 and an additional cost increase which would otherwise be caused by such other measure.

Furthermore, according to the first embodiment, since the vehicle 10 includes both the ENG clutch 26 (the first switching device) and the GEN clutch 28 (the second switching device), the vehicle 10 can preferably use the engine 20 and the generator 22 (the first rotating electrical machine) depending on how the vehicle 10 is running. For example, if the generator 22 can generate electric power using the power Teng from the engine 20, the use of the GEN clutch 28 makes it possible to selectively make the generator 22 generate the electric power depending on the necessity. In that case, the control of the ENG clutch 26 makes it possible to transmit the power Teng from the engine 20 to the generator 22 without transmitting it to the wheels 34.

In the first embodiment, while the power Teng is being transmitted from the engine 20 to the wheels 34 with the ENG clutch 26 (the first switching device) ON (in the connecting state), if the vehicle speed V becomes greater than the first vehicle speed threshold value THv1 and the vehicle 10 enters into a cruising state (a constant speed state) (YES in step S1 in FIG. 5), the ECU 54 (the controller) switches the GEN clutch 28 (the second switching device) from the connecting state to the disconnecting state (in step S3).

Thereby, it is possible to avoid an increase in the amount of heat produced by the generator 22 (the first rotating electrical machine) which would otherwise be caused by continued high speed state (in FIG. 9). Moreover, while the generator 22 is being used to drive the vehicle 10, the generation of the traction drive force Fd of the vehicle 10 using both the engine 20 and the generator 22 for the acceleration of the vehicle 10 makes it possible to enhance the acceleration of the vehicle 10.

In the first embodiment, the vehicle 10 includes the torque limiter 32 arranged on the second transmission route 72, and configured to limit the power Teng from the engine 20 to the generator 22 (the first rotating electrical machine) (in FIGS. 1 and 2). This makes it possible to prevent excessive power from being transmitted to the engine 20 or the generator 22 by switching the generator 22 between its connection to the engine 20 and its connection to the wheels 34 using the GEN clutch 28 (the second switching device).

In the first embodiment, when the ENG clutch 26 (the first switching device) is ON (in the connecting state), the vehicle speed V is greater than the first vehicle speed threshold value THv1, and the GEN clutch 28 (the second switching device) is OFF (in the disconnecting state) (in step S3 in FIG. 5), the ECU 54 performs control (electric power generation priority control) to switch the ENG clutch 26 from ON to OFF, and the GEN clutch 28 from OFF to ON, to make the generator 22 generate electric power using the power Teng from the engine 20, and thereby to supply the electric power to either or both of the battery 36 and the electrically-operated accessories 52 (in step S5).

Thereby, for example, while the vehicle 10 is running at high speed, it is possible to assist the battery 36 by: preferentially supplying the power Teng from the engine 20 to the generator 22 without transmitting the power Teng to the wheels 34; and thereby making the generator 22 generate electric power. In other words, the generated electric power Pgen from the generator 22 can be used to charge the battery 36, or to operate the electrically-operated accessories 52.

In the first embodiment, while the ENG clutch 26 (the first switching device) is ON (in the connecting state), the vehicle speed V is greater than the first vehicle speed threshold value THv1, and the GEN clutch 28 (the second switching device) is OFF (in the disconnecting state) (in step S3 in FIG. 5), if the SOC (state of charge) in the battery 36 becomes less than the SOC threshold value THsoc (YES in step S4), the ECU 54 switches the ENG clutch 26 from ON to OFF, and the GEN clutch 28 from OFF to ON, to make the generator 22 generate electric power using the power Teng from the engine 20, and thereby to charge the battery 36 (in step S5).

This makes it possible to charge the battery 36 if the state of charge in the battery 36 is low.

If the vehicle speed V becomes less than the second vehicle speed threshold value THv2 while the ECU 54 is performing the electric power generation priority control (YES in step S6), the ECU 54 (the controller) switches the ENG clutch 26 (the first switching device) from OFF (in the disconnecting state) to ON (in the connecting state), and the GEN clutch 28 (the second switching device) from ON to OFF (in step S3). Thereby, the ECU re-accelerates the vehicle 10 if the vehicle 10 decelerates to a certain extent. Accordingly, it is possible to inhibit the deceleration of the vehicle 10 from making the driver feel something different.

In the first embodiment, the vehicle 10 includes:

the traction motor 24 (the second rotating electrical machine); the third transmission route 76 connecting the second junction 78 and the transmission motor 24 (the second rotating electrical machine), the second junction 78 located on the first transmission route 70 and closer to the wheels 34 than the ENG clutch 26 (the first switching device) is; and the TRC clutch 30 (the third switching apparatus) arranged on the third transmission route 76, and configured to be switched between the connecting state which connects the first transmission route 70 and the traction motor 24 and the disconnecting state which disconnects the first transmission route 70 and the traction motor 24 (FIGS. 1 and 2).

Thereby, the vehicle 10 can be driven by the traction motor 24 with the ENG clutch 26 OFF (in the disconnecting state). In that case, electric power can be generated by the generator 22 (the first rotating electrical machine) using the power Teng from the engine 20.

If the vehicle speed V becomes greater than the first vehicle speed threshold value THv1 while the power Teng is being transmitted from the engine 20 to the wheels 34 with the ENG clutch 26 ON (in the connecting state) (YES in step S1 in FIG. 5), the ECU 54 performs control to switch the TRC clutch 30 (the third switching device) OFF (to the disconnecting state) in addition to switching the GEN clutch 28 (the second switching device) OFF (to the disconnecting state) (in step S3). Thereby, for example, in the case where the traction motor 24 (the second rotating electrical machine) is disconnected from the first transmission route 70 while the vehicle 10 is being driven at high speed by the power Teng from the engine 20, it is possible to inhibit heat generation caused by eddy current produced by the traction motor 24 which would otherwise rotate using the power Teng from the engine 20. Accordingly, other measure for preventing the overheating of the traction motor 24 (for example, a restriction to be imposed on the output from the engine 20) becomes no longer necessary. Thus, it is possible to inhibit a decrease in marketability of the vehicle 10 and an additional cost increase which would otherwise be caused by such other measure.

In the first embodiment, the ECU 54 performs control to drive the vehicle 10 using the power Teng from the engine 20 with the ENG clutch 26 (the first switching device) ON (in the connecting state), and to switch the GEN clutch 28 (the second switching device) and the TRC clutch 30 (the third switching device) OFF (to the disconnecting state) (in step S3 in FIG. 5). If the vehicle 10 brakes while the clutches are in the above mentioned states, the ECU 54 switches the ENG clutch 26 OFF, and the TRC clutch 30 ON, to make the traction motor 24 generate regenerative electric power (the control pattern PA41 in FIG. 4, the operations from time t3 to time t4 in FIG. 6, and the operations from time t19 to time t20 in FIG. 7).

This makes it possible to inhibit loss in the regenerative energy caused by the engine 20 which would otherwise be made to idle while the traction motor 24 is generating the regenerative electric power.

B. Second Embodiment

[B-1. Configuration of Vehicle 10A]
<B-1-1. Overall Configuration (Difference from First Embodiment)>

FIG. 10 is a schematic configuration diagram of a vehicle 10A of a second embodiment of the disclosure. Components which are the same as those of the first embodiment will be denoted by the same reference signs, and detailed descriptions for such components will be omitted.

The vehicle 10 of the first embodiment includes the two rotating electrical machines 22, 24 (the generator 22 and the traction motor 24) (FIG. 1). In contrast to this, the vehicle 10A of the second embodiment includes only one rotating electrical machine 120.

Like the vehicle 10 of the first embodiment, the vehicle 10A of the second embodiment includes three clutches (first to third clutches 130, 132, 134). However, the arrangement of the first to third clutches 130, 132, 134 is different from that of the first to third clutches 26, 28, 30 of the first embodiment, since the vehicle 10A of the second embodiment includes the single rotating electrical machine 120 only.

A group of the engine 20, the rotating electrical machine 120, the first clutch 130, the second clutch 132, the third clutch 134 is hereinafter referred to as a "drive line 60a." Furthermore, a power transmission route connecting the engine 20 and the wheels 34 is termed a first transmission route 140. A power transmission route connecting the first transmission route 140 and the rotating electrical machine 120 is termed a second transmission route 142. A junction at which the second transmission route 142 branches from the first transmission route 140 is termed a junction 144.

It should be noted that a temperature sensor 46 shown in FIG. 10 detects a coil temperature Tc in the rotating electrical machine 120, and sends it to ECU 54.

<B-1-2. Rotating Electrical Machine 120>

The rotating electrical machine 120 is of a three-phase AC brushless type, and has functions as the traction motor and the generator. To put it specifically, as a second drive source for the traction of the vehicle 10A, the rotating electrical machine 120 generates power Tmg, and supplies the power Tmg to the wheels 34 (the driving wheels), when the rotating electrical machine 120 functions as the traction motor. When the vehicle 10A is braked, the rotating electrical machine 120 functions as a regenerative brake, and thus supplies the regenerative electric power Preg to the battery 36 or the electrically-operated accessories 52 via an inverter, albeit not illustrated.

Furthermore, when the rotating electrical machine 120 functions as the generator, the rotating electrical machine 120 generates electric power using the power Teng from the engine 20, and supplies the electric power to the battery 36 or the electrically-operated accessories 52 via the inverter, albeit not illustrated.

The rotating electrical machine 120 will be hereinafter referred to as a "motor/generator 120" as well. "MG" or "mg" will be hereinbelow added to parameters related to the motor/generator 120. Furthermore, in FIG. 10 and the like, the motor/generator 120 is shortened to "MG." The motor/generator 120 can be used as a starter motor for the engine 20.

<B-1-3. First Clutch 130, Second Clutch 132 and Third Clutch 134>

The first clutch 130 (the first switching device) is arranged on the first transmission route 140 between the wheels 34 and the junction 144. The first clutch 130 is switched between a connecting state which connects the wheels 34 and a combination of the engine 20 and the motor/generator 120 and a disconnecting state which disconnects the wheels 34 and the combination of the engine 20 and the motor/generator 120, based on instructions from the ECU 54. In other words, the first clutch 130 is located in a position corresponding to the first clutch 26 of the first embodiment. The first clutch 130 will be hereinafter referred to as a COM clutch 130 as well. In this respect, "COM" means the first clutch 130 is a clutch "common" to the engine 20 and the motor/generator 120.

The second clutch 132 (the second switching device) is arranged on the second transmission route 142. The second clutch 132 is switched between a connecting state which connects the first transmission route 140 and the motor/generator 120 and a disconnecting state which disconnects the first transmission route 140 and the motor/generator 120, based on instructions from the ECU 54. The second clutch 132 will be hereinafter referred to as a MG clutch 132 as well.

The third clutch 134 (the third switching device) is arranged on the first transmission route 140 between the engine 20 and the junction 144. The third clutch 134 is switched between a connecting state which connects the engine 20 and the wheels 34 (or the junction 144) and a disconnecting state which disconnects the engine 20 and the wheels 34 (or the junction 144), based on instructions from the ECU 54. The third clutch 134 will be hereinafter referred to as an ENG clutch 134 as well.

[B-2. Traction Modes]

FIG. 11 is a diagram showing relationships among the traction modes and the first to third clutches 130, 132, 134 in the second embodiment. As mentioned above, the second embodiment uses the single rotating electrical machine 120 only. For this reason, the second embodiment uses mainly the MOT traction mode and the ENG traction mode. Like the first embodiment, the second embodiment selects the traction modes mainly depending on the vehicle speed V and the traction drive force Fd of the vehicle 10A. Moreover, control patterns PA51, PA52, PA61 to PA65, PA71 in FIG. 11 correspond to the control patterns PA11, PA12, PA31 to PA35, PA41 in FIG. 4.

[B-3. Control in Second Embodiment]

<B-3-1. Switching of Drive Modes>

(A-3-1-1. Outline)

FIG. 11 is a diagram showing relationships among the traction modes and the first to third clutches 130, 132, 134 in the second embodiment. AS shown in FIG. 11, the second embodiment uses the MOT traction mode, the ENG traction mode and the regeneration mode. Like the first embodiment, the second embodiment selects the MOT traction modes mainly depending on the vehicle speed V and the traction drive force Fd of the vehicle 10A.

(B-3-1-2. High-Speed Cruise Control)

Next, descriptions will be provided for a high-speed cruise control to be performed by the ECU 54 to make the vehicle 10A cruise at high-speed. The high-speed cruise control is a control for selectively using the control patterns PA62, PA64 (FIG. 11) under the ENG traction mode. The control pattern PA65 may be used in addition to or in lieu of the control patterns PA62, PA64.

Figure 12:
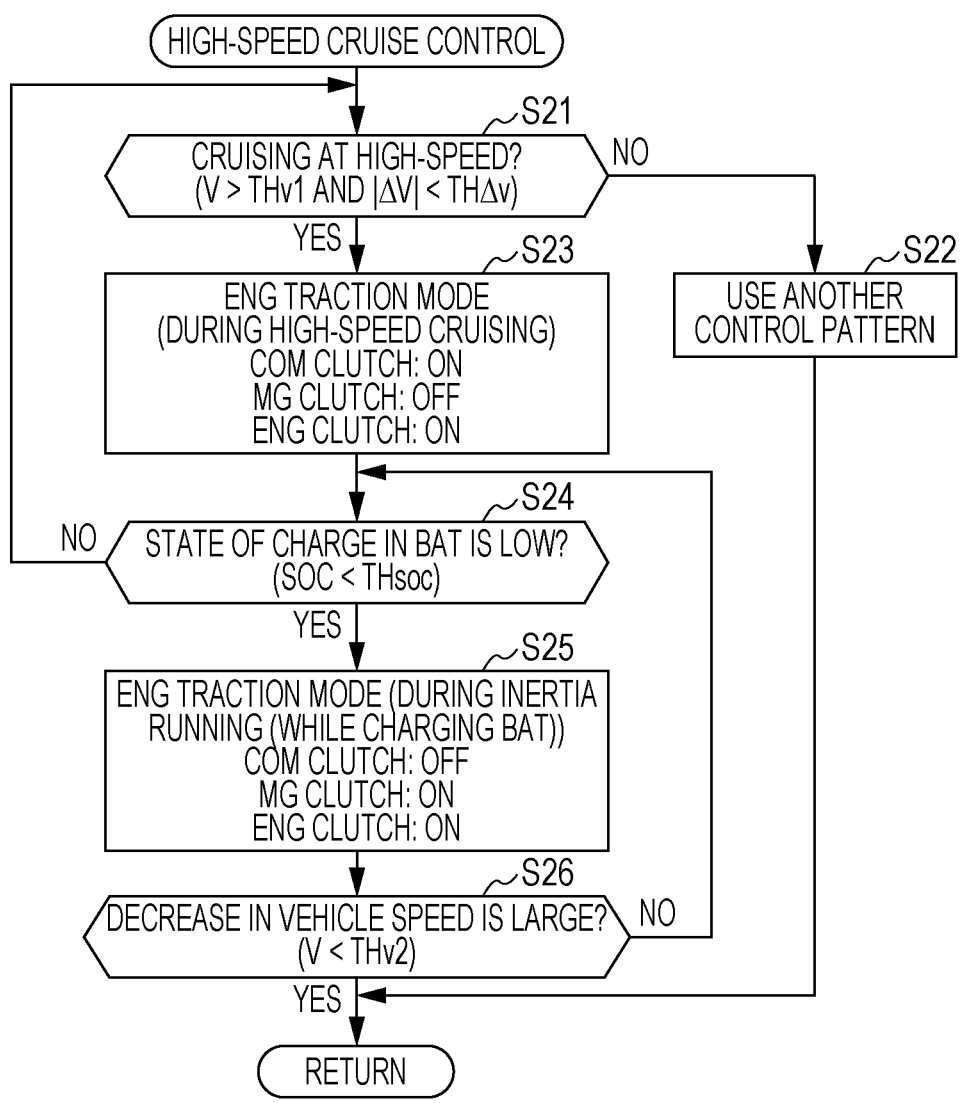
FIG. 12 is a flowchart of a high-speed cruise control in the second embodiment.
Figure 13:
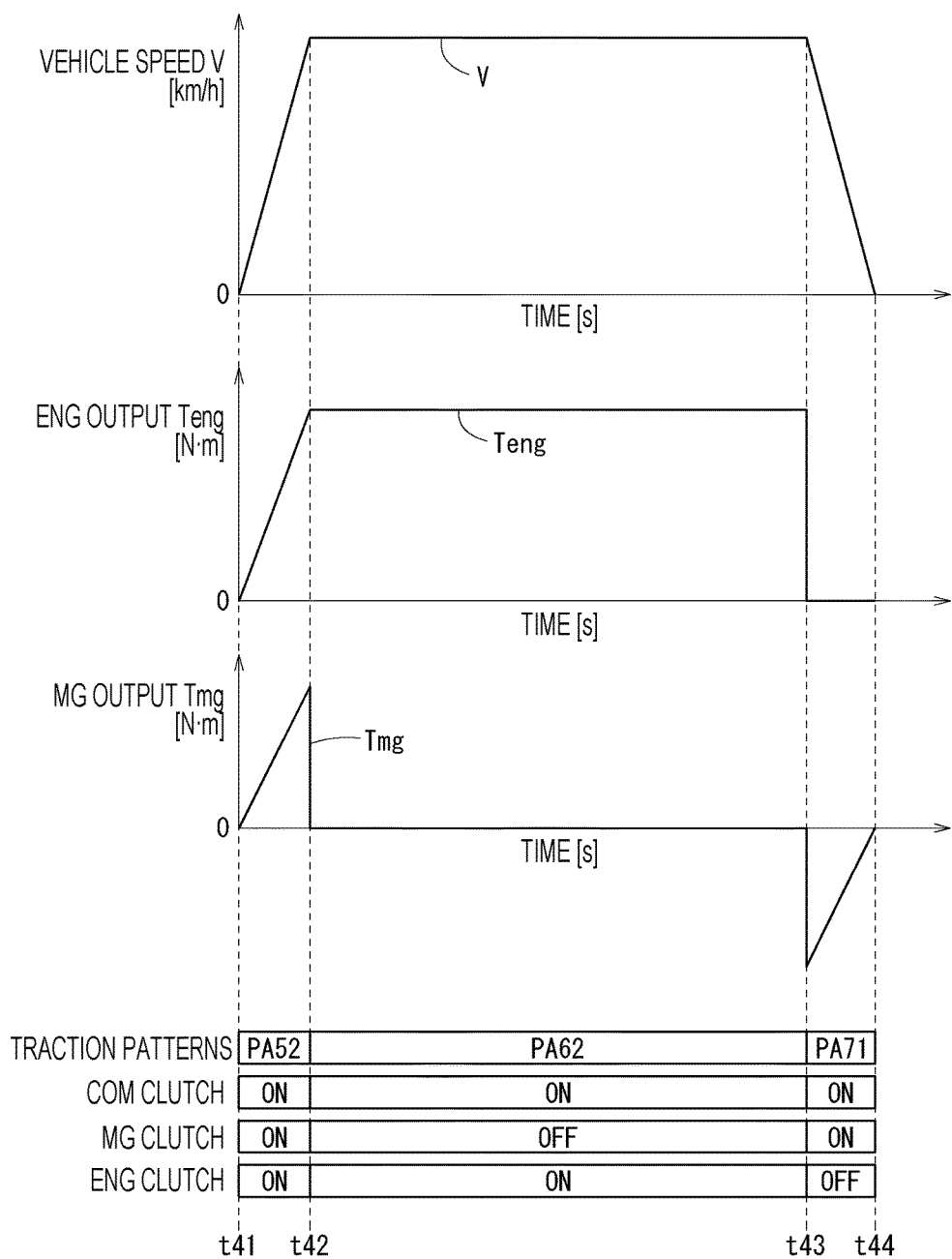
FIG. 13 is a diagram showing a first example of relationships among parameters of the high-speed cruise control and operations of the first to third clutches in the second embodiment.
Figure 14:
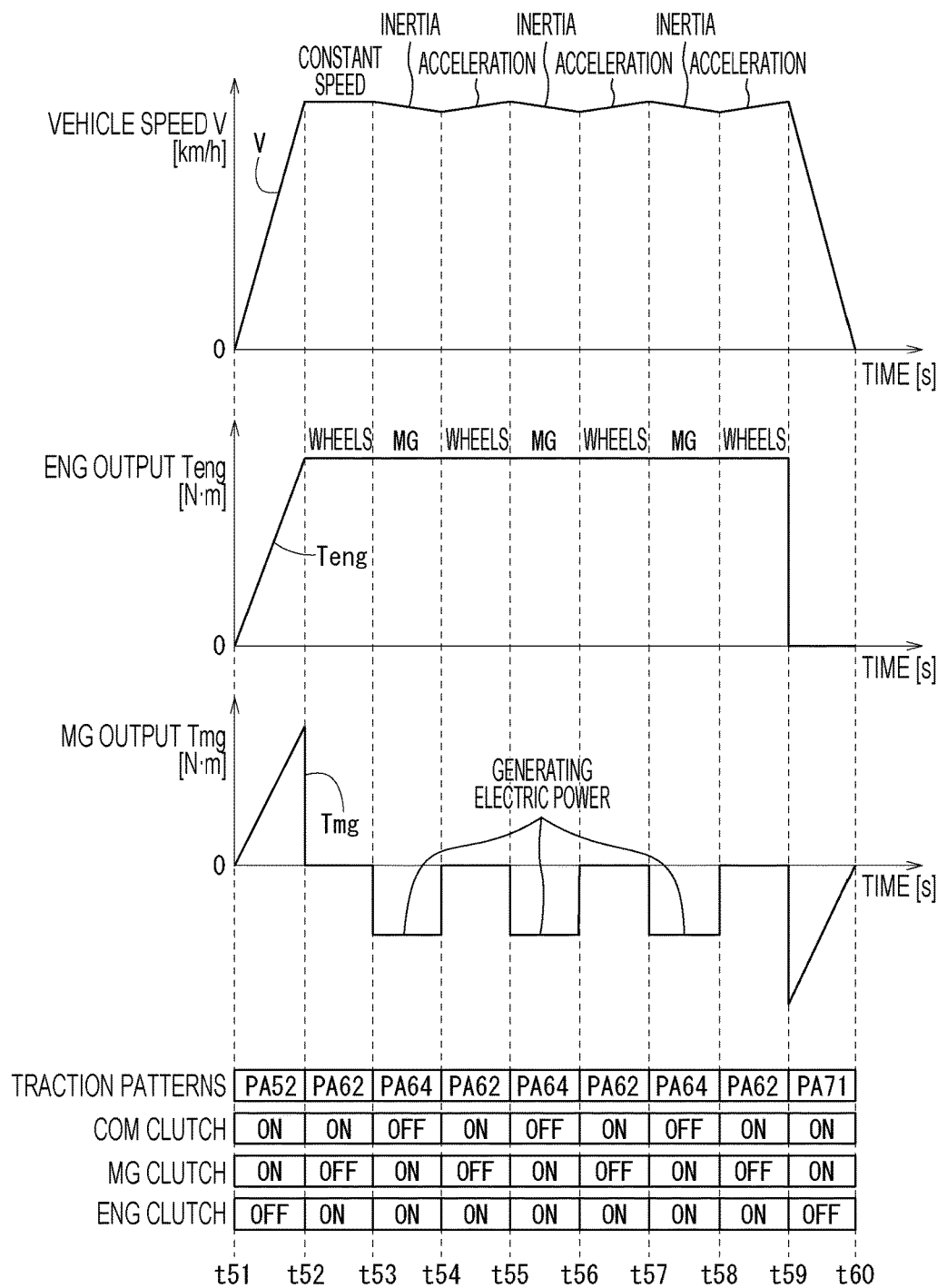
FIG. 14 is a diagram showing a second example of relationships among parameters of the high-speed cruise control and operations of the first to third clutches in the second embodiment.

FIG. 12 is a flowchart of the high-speed cruise control in the second embodiment. FIGS. 13 and 14 are diagrams showing first and second examples of relationships among the parameters of the high-speed cruise control and the operations of the first to third clutches 130, 132, 134 in the second embodiment.

The parameters shown in FIGS. 13 and 14 are the vehicle speed V, the output from the engine 20 (ENG output Teng), and the output from the motor/generator 120 (MG output Tgen).

In FIG. 14, "WHEELS" and "MG" shown with the ENG OUTPUT Teng represents where the ENG OUTPUT Teng is transmitted to, like in FIG. 7. To put it specifically, at a timing corresponding to "WHEELS" (for example, at a timing from time t52 to time t53), the ENG OUTPUT Teng (Power Teng) is transmitted to the wheels 34. At a timing corresponding to "GEN" (for example, at a timing from time t53 to time t54), the ENG OUTPUT Teng (Power Teng) is transmitted to the motor/generator 120.

Steps S21, S22 in FIG. 12 are the same as step S1, S2 in FIG. 5. If the vehicle 10A is cruising at high speed (YES in step S21), the ECU 54 proceeds to step S23.

In step S23, the ECU 54 selects the control pattern PA62 under the ENG traction mode. To put it specifically, the ECU 54 turns the COM clutch 130 and the ENG clutch 134 ON, and the MG clutch 132 OFF, while operating the engine 20 (see FIG. 13).

In FIG. 13, from time t41 to time t42, the vehicle 10A accelerates using the control pattern PA51 under the MOT traction mode (and may use the control pattern PA52 or the like in addition). Thereafter, from time t42 to time t43, the vehicle 10A cruises at high speed using the control pattern PA 62 under the ENG traction mode. After that, from time t43 to time t44, the vehicle 10A decelerates using the control pattern PA71 under the regeneration mode.

Returning to FIG. 12, step S24 is the same as step 4 in FIG. 5. If the state of charge in the battery 36 is low (YES in step 24), the ECU 54 proceeds to step S25.

In step S25, the ECU 54 selects the control pattern PA64 under the ENG traction mode. To put it specifically, the ECU 54 turns the COM clutch 130 OFF, the MG clutch 132 and the ENG clutch 134 ON, while operating the engine 20 (see the clutches from time t53 to time t54, from time t55 to time t56, and from time t57 to time t58 in FIG. 7). Thereby, while the vehicle 10A is running by inertia, the high-voltage battery 36 can be charged by making the motor/generator 120 generate electric power using the power Teng from the engine 20. Incidentally, fuel injection into the engine 20 may be suspended for all or part of the time step S25 is being executed. In addition to this, the electric power may be generated the motor/generator 120 using its inertial force alone with the MG clutch 132 temporarily switched OFF.

Step S26 in FIG. 12 is the same as step S6 in FIG. 5.

Accordingly, if the state of charge in the battery 36 is low (YES in step 24), the ECU 54 repeats steps S23, S25 (see the clutches from time t52 to time t59 in FIG. 14).

In FIG. 14, from time t51 to time t52, the vehicle 10A accelerates using the control pattern PA51 under the MOT traction mode (and may use the control pattern PA52 or the like in addition to the control pattern PA51). Thereafter, the vehicle 10A cruises at high speed alternately using the control pattern PA62 (in step S23 in FIG. 12) and the control pattern PA64 (in step S25 in FIG. 5) under the ENG traction mode. After that, from time t59 to time 60, the vehicle 10A decelerates using the control pattern PA71 under the regeneration mode.

<B-4. Effects of Second Embodiment>

The foregoing second embodiment can bring about the following effects in addition to or in lieu of the effects of the first embodiment.

According to the second embodiment, the vehicle 10A includes the ENG clutch 134 (the third switching device) in addition to the COM clutch 130 (the first switching device) and the MG clutch 132 (the second switching device). The ENG clutch 134 is arranged on the first transmission route 140, and is closer to the engine 20 than the junction 144 (the first junction) is. The ENG clutch 134 is switched between a connecting state which connects the engine 20 and the combination of the wheels 34 and the motor/generator 120 (the first rotating electrical machine) and a disconnecting state which disconnects the engine 20 and the combination of the wheels 34 and the motor/generator 120 (the first rotating electrical machine).

This makes it possible to disconnect the engine 20 from the combination of the wheels 34 and the motor/generator 120 with the wheels 34 and the motor/generator 120 kept connected together. If this condition is used while the motor/generator 120 is functioning as the regenerative brake in conjunction of the braking the vehicle 10A, it is possible to efficiently recover the regenerative energy while the vehicle 10A is braking. Furthermore, if the above condition is used while the vehicle 10A is running using the motor/generator 120, it is possible to eliminate resistance which would otherwise be caused by the engine 20, and thereby to enhance the driving efficiency (or the actual fuel mileage) of the vehicle 10A.

C. Modifications

It should be noted that the disclosure is not limited to the foregoing embodiments. It is a matter of course that various configurations may be employed based on what have been described in the specification. For instance, the following configurations may be employed.

[C-1. Applications]

The vehicle 10 of the first embodiment includes the engine 20, the generator 22 and the traction motor 24 (FIG. 1), while the vehicle 10A includes the engine 20 and the motor/generator 120 (FIG. 10). However, what are included in the vehicle are not limited to these examples from a viewpoint that, for instance, the rotating electrical machines are disconnected while the vehicle is running at high speed using the engine 20. For instance, the vehicle 10 may have a configuration including the engine 20 and three rotating electrical machines.

[C-2. Rotating Electrical Machines]

The first and second rotating electrical machines 22, 24 of the first embodiment and the rotating electrical machine 120 of the second embodiment are of the three-phase AC brushless type. However, the rotating electrical machines are not limited to this example from the viewpoint that, for instance, the rotating electrical machines are disconnected while the vehicle is running at high speed using the engine 20. The first and second rotating electrical machines 22, 24 of the first embodiment and the rotating electrical machine 120 of the second embodiment may be of a DC type or of a brush type.

[C-3. Clutches]

The second embodiment is provided with the first to third clutches 130, 132 134 (FIG. 10). However, the clutches are not limited to this example from a viewpoint that, for instance, the motor/generator 120 is disconnected while the vehicle is running at high speed using the engine 20. For instance, the third clutch 134 may be omitted.

The first embodiment includes the second junction 78 which is placed between the ENG clutch 26 and the wheels 34, and to which the traction motor 24 and the third clutch 30 are connected (FIGS. 1 and 2). However, the placement of the second junction 78 is not limited to this example from a viewpoint that, for instance, the generator 22 is disconnected while the vehicle is running at high speed using the engine 20. For instance, the second junction 78 may be placed closer to the engine 20 than the ENG clutch 26 is.

[C-4. Torque Limiter 32]

The first embodiment is provided with the torque limiter 32 (FIGS. 1 and 2). However, the torque limiter is not limited to this example from the viewpoint that, for instance, the rotating electrical machines are disconnected while the vehicle is running at high speed using the engine 20. For instance, the torque limiter 32 may be omitted. Otherwise, the first embodiment may be provided with a different torque limiter between the traction motor 24 and the second junction 78. This is the case with the second embodiment as well.

[C-5. Traction Modes and Control Patterns]

The first embodiment uses the traction modes and the control patterns shown in FIGS. 3 and 4, while the second embodiment uses the traction modes and the control patterns shown in FIG. 11. However, the traction modes or the control patterns are not limited to these examples from the viewpoint that, for instance, the rotating electrical machines are disconnected while the vehicle is running at high speed using the engine 20.

For instance, some control patterns shown in FIGS. 4 and 11 may be omitted. Other control patterns may be used. For instance, if required braking torque is larger (in other words, if quick deceleration is needed) under the regeneration mode, the ECU may perform control to switch all of the ENG clutch 26, the GEN clutch 28 and the TRC clutch 30 of the first embodiment to the connecting state (ON) to operate the engine brake while making the generator 22 and the traction motor 24 generate regenerative electric power. Otherwise, under the regeneration mode, the ECU may perform control to switch the TRC clutch 30 of the first embodiment to the disconnecting state (OFF), as well as the ENG clutch 26 and the GEN clutch 28 of the first embodiment to the connecting state (ON), to make the generator 22 generate regenerative electric power.

[C-6. High-Speed Cruise Control]

In each foregoing embodiment, the vehicle speed V and the absolute value |ΔV| of the time derivative value of the vehicle speed V are used to determine whether or not the vehicle is cruising at high speed (step S1 in FIG. 5 and step S21 in FIG. 12). However, what are used to make the determination are not limited to this example from the viewpoint that, for instance, the rotating electrical machines are disconnected while the vehicle is running at high speed using the engine 20.

In the first embodiment, the determination that the vehicle is cruising at high speed (YES in step S1 in FIG. 5) is used as the criterion for using the control pattern PA32 (ENG clutch 26: ON, GEN clutch 28: OFF, and TRC clutch 30: OFF). However, the determination to be used as the criterion is not limited to this example from the viewpoint that, for instance, the rotating electrical machines are disconnected while the vehicle is running at high speed using the engine 20. For instance, the selection of the control pattern PA 32 in step S1 in FIG. 5 may be achieved by using only a determination that the vehicle 10 is running at high speed (V>THv1). This is the case with the second embodiment as well.

In the first embodiment, the inertia running is terminated if the vehicle speed V becomes less than the second vehicle speed threshold value THv2 (YES in step S6 in FIG. 5). However, the criterion for when to terminate the inertia running is not limited to this example. For instance, the inertia running may be terminated if the absolute value |ΔV| of the time derivative value of the vehicle speed V becomes greater than a second acceleration threshold value THΔv2.

In the first embodiment, the high-speed cruise control is performed using the flowchart shown in FIG. 5. The high-speed cruise control is not limited to this example.

Figure 15:
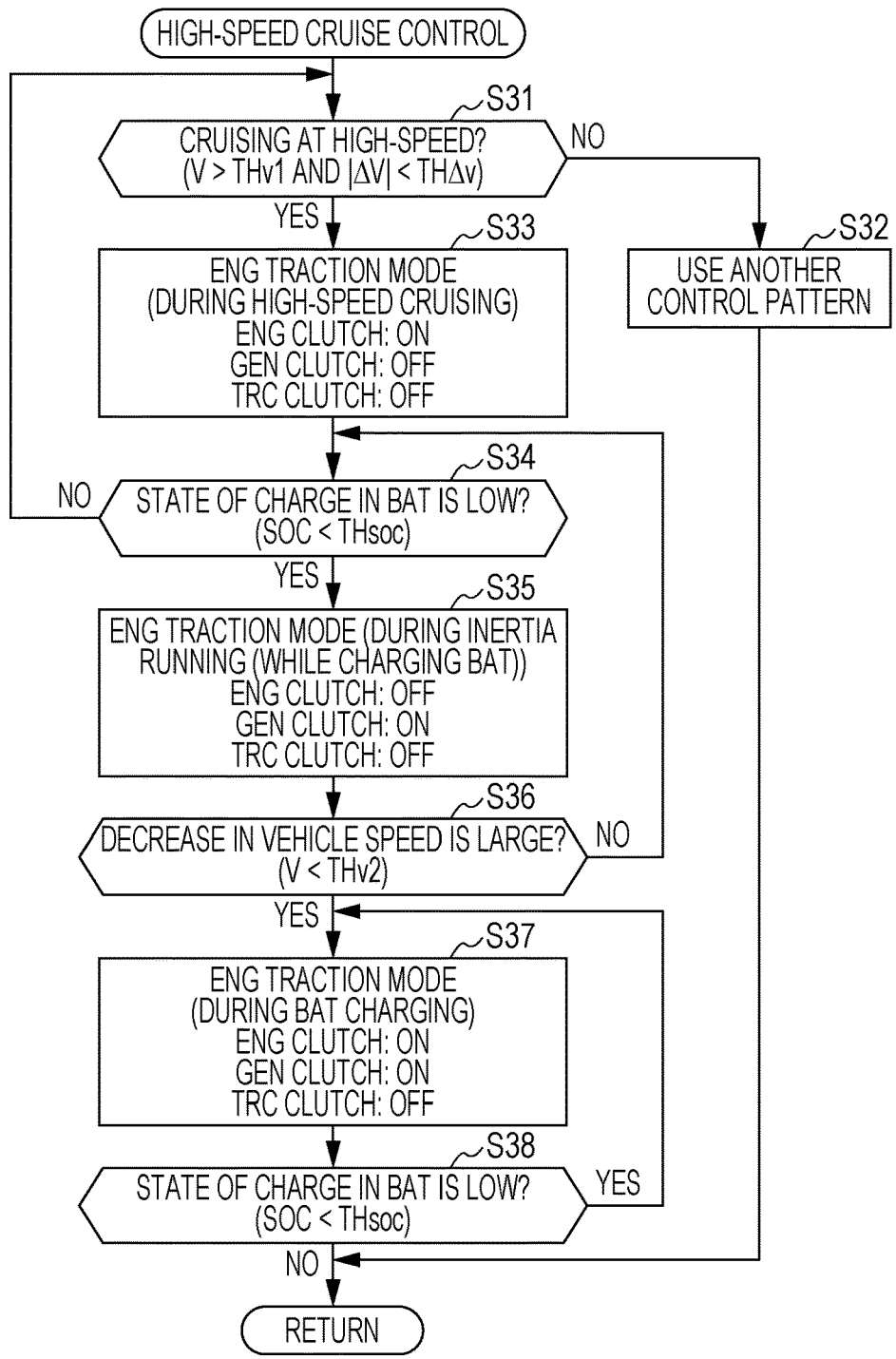
FIG. 15 is a flowchart of a high-speed cruise control in a first modification.

FIG. 15 is a flowchart of a high-speed cruise control in a first modification. Steps S31 to S36 in FIG. 15 are the same as steps S1 to S6 in FIG. 5. If a decrease in the vehicle speed V is large (YES in step S36), the ECU proceeds to step S37.

In step S37, the ECU 54 selects the control pattern PA33 under the ENG traction mode. To put it specifically, the ECU 54 turns the ENG clutch 26 and the GEN clutch 28 ON, and the TRC clutch 30 OFF, while operating the engine 20. Thereby, using the power Teng from the engine 20, the vehicle 10 is driven and electric power is generated by the generator 22. Accordingly, it is possible to charge the high-voltage battery 36 while making the vehicle 10 run.

In step S38, the ECU 54 determines whether or not the state of charge (SOC) in the high-voltage battery 36 is low. This determination is made like in step S34 in FIG. 15 (or step S4 in FIG. 5). If the state of charge is low (YES in step S38), the ECU 54 repeats step S37. If the state of charge is not low (NO in step S38), the ECU 54 terminates the current process, and returns to step S31.

Figure 16:
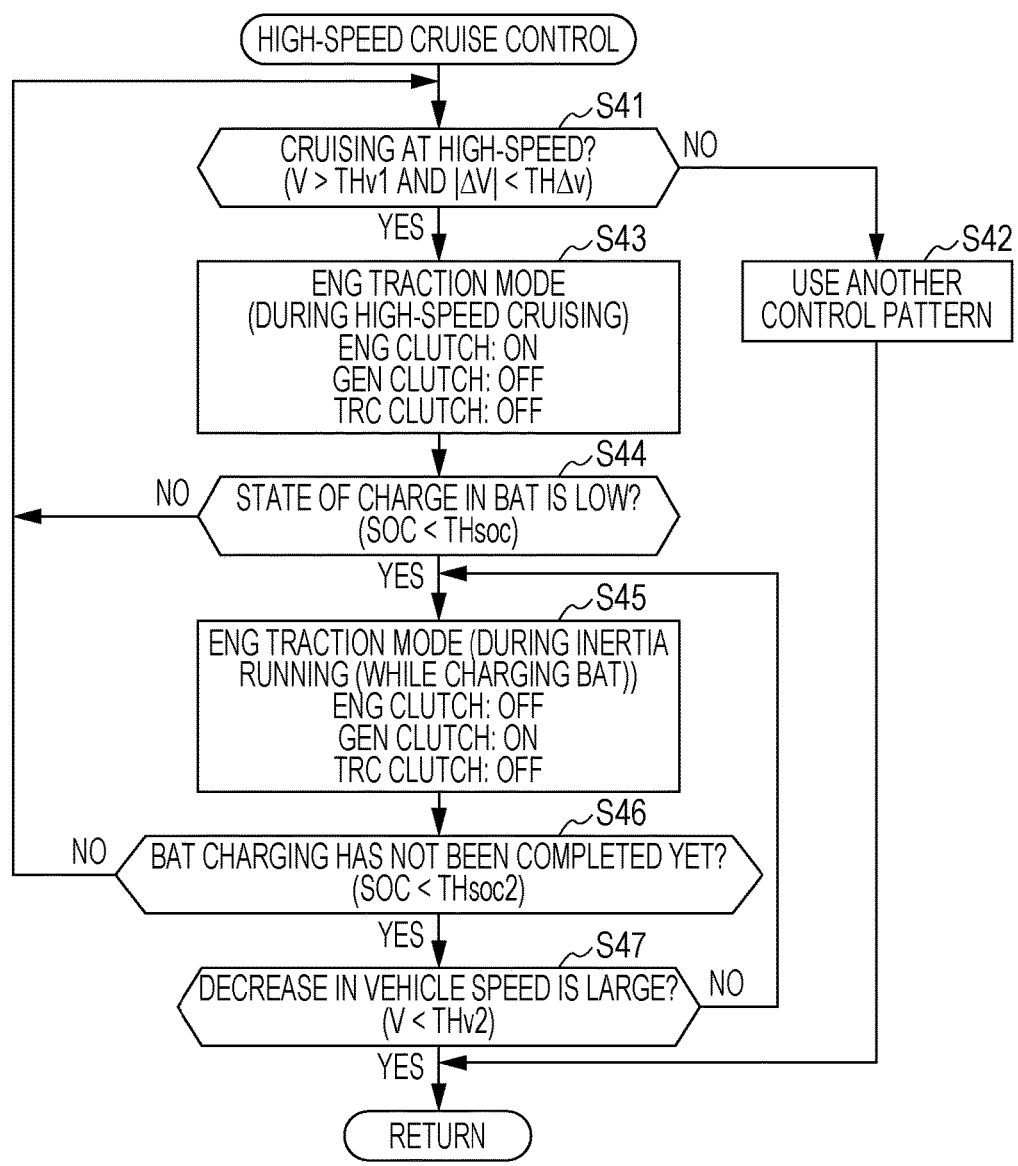
FIG. 16 is a flowchart of a high-speed cruise control in a second modification.

FIG. 16 is a flowchart of a high-speed cruise control in a second modification. Steps S41 to S45 in FIG. 16 are the same as steps S1 to S5 in FIG. 5. After step S45 in FIG. 16, the ECU 54 determines in step S46 whether the charging of the battery 36 has not been completed yet. To put it specifically, the ECU 54 determines whether or not the SOC from the SOC sensor 40 is less than a second SOC threshold value THsoc2.

The second SOC threshold value THsoc2 is set at a value higher than the SOC threshold value THsoc. For instance, when the second SOC threshold value THsoc2 is set at an appropriate value for preventing the high-voltage battery 36 from being overcharged, it is possible to prevent the SOC in the high-voltage battery 36 from becoming too high. Accordingly, it is possible to securely prevent the high-voltage battery 36 from being overcharged.

If the charging of the battery 36 has not been completed yet (YES in step S46), the ECU 54 proceeds to step S47. If the charging of the battery 36 has been completed (NO in step S46), the ECU 54 returns to step S41.

In step S47, the ECU 54 determines whether or not a decrease in the vehicle speed V is large. This determination is made like in step S6 in FIG. 5. If the decrease in the vehicle speed V is not large (NO in step S47), the ECU 54 returns to step S45. If the decrease in the vehicle speed V is large (YES in step S47), the ECU 54 terminates the current process, and returns to step S41. Thus, if the charging of the battery 36 has not been completed yet (YES in step S46), and if the decrease in the vehicle speed V is not large (NO in step S47), the ECU 54 repeats step S45.

[C-7. Overheat Inhibiting Control]

Each foregoing embodiment uses the overheat inhibiting control (FIG. 8). The embodiment is not limited to this example from the viewpoint that, for instance, the rotating electrical machines are disconnected while the vehicle is running at high speed using the engine 20. For instance, the overheat inhibiting control may be omitted.

The present embodiment includes: an internal combustion engine; a first transmission route configured to transmit power produced by the internal combustion engine to a wheel; a first switching device arranged on the first transmission route, and configured to be switched between a connecting state which connects the internal combustion engine and the wheel and a disconnecting state which disconnects the internal combustion engine and the wheel; a first rotating electrical machine; a second transmission route connecting a first junction and the first rotating electrical machine, the first junction located on the first transmission route and closer to the internal combustion engine than the first switching device is; a second switching device arranged on the second transmission route, and configured to be switched between a connecting state which connects the first transmission route and the first rotating electrical machine and a disconnecting state which disconnects the first transmission route and the first rotating electrical machine; and a control circuit configured to control the first switching device and the second switching device, wherein while the power is being transmitted from the internal combustion engine to the wheel with the first switching device in the connecting state, if a vehicle speed of the vehicle becomes greater than a first vehicle speed threshold value, the control circuit performs control to switch the second switching device to the disconnecting state.

According to the present embodiment, while the power is being transmitted from the internal combustion engine to the wheel, if the vehicle speed becomes greater than the first vehicle speed threshold value, the control is performed to switch the second switching device to the disconnecting state. Thereby, in a case where the first rotating electrical machine need not generate electric power, it is possible to improve the fuel efficiency of the vehicle by disconnecting the first rotating electrical machine from the internal combustion engine.

In addition, while the vehicle is driven at high speed using the power from the internal combustion engine, the first rotating electrical machine is disconnected from the first transmission route. This makes it possible to inhibit heat generation caused by eddy current produced by the first rotating electrical machine which would otherwise rotate using the power from the internal combustion engine. Accordingly, other measure for preventing overheating of the first rotating electrical machine (for example, a restriction to be imposed on output from the internal combustion engine) becomes no longer necessary. Thus, it is possible to inhibit a decrease in marketability of the vehicle and an additional cost increase which would otherwise be caused by such other measure.

Furthermore, according to the present embodiment, the vehicle includes both the first switching device and the second switching device. For this reason, the vehicle can preferably use the internal combustion engine and the first rotating electrical machine depending on how the vehicle is running. For example, if the first rotating electrical machine can generate electric power using the power from the internal combustion engine, the use of the second switching device makes it possible to selectively make the first rotating electrical machine generate the electric power depending on the necessity. In that case, the control of the first switching device makes it possible to transmit the power from the internal combustion engine to the first rotating electrical machine without transmitting it to the wheel.

While the power is being transmitted from the internal combustion engine to the wheel with the first switching device in the connecting state, if the vehicle speed becomes greater than the first vehicle speed threshold value and the vehicle enters into a cruising state, the control circuit may switch the second switching device from the connecting state to the disconnecting state.

Thereby, it is possible to avoid an increase in the amount of heat produced by the first rotating electrical machine which would otherwise be caused by continued high speed cruising. Moreover, while the first rotating electrical machine is being used to drive the vehicle, the generation of driving force of the vehicle using both the internal combustion engine and the first rotating electrical machine for the acceleration of the vehicle makes it possible to enhance the acceleration of the vehicle.

The vehicle may include a torque limiter arranged on the second transmission route, and configured to limit transmission of the power from the internal combustion engine to the first rotating electrical machine. This makes it possible to prevent excessive power from being transmitted to the internal combustion engine or the first rotating electrical machine by switching the first rotating electrical machine between its connection to the internal combustion engine and its connection to the wheel using the second switching device.

When the first switching device is in the connecting state, the vehicle speed is greater than the first vehicle speed threshold value, and the second switching device is in the disconnecting state, the control circuit may perform electric power generation preferential control to switch the first switching device from the connecting state to the disconnecting state, and the second switching device from the disconnecting state to the connecting state, to make the first rotating electrical machine generate electric power using the power from the internal combustion engine, and thereby to supply the electric power to either or both of an energy storage and an electrically-operated accessory.

Thereby, for example, while the vehicle is running at high speed, it is possible to assist the energy storage by: preferentially supplying the power from the internal combustion engine to the first rotating electrical machine without transmitting the power to the wheel; and thereby making the first rotating electrical machine generate electric power. In other words, the generated electric power from the generator 22 can be used to charge the battery or to operate the electrically-operated accessories.

When the first switching device is in the connecting state, the vehicle speed is greater than the first vehicle speed threshold value, and the second switching device is in the disconnecting state, if a state of charge in the energy storage becomes less than a predetermined state-of-charge threshold value, the control circuit may switch the first switching device from the connecting state to the disconnecting state, and the second switching device from the disconnecting state to the connecting state, to make the first rotating electrical machine generate electric power using the power from the internal combustion engine, and thereby to charge the energy storage. This makes it possible to charge the energy storage if the state of charge in the energy storage is low.

While the control circuit is performing the electric power generation preferential control, if the vehicle speed becomes less than a second vehicle speed threshold value, or if an absolute value of a time derivative value of the vehicle speed becomes greater than an acceleration threshold value, the control circuit may switch the first switching device from the disconnecting state to the connecting state, and the second switching device from the connecting state to the disconnecting state. Thereby, the control circuit re-accelerates the vehicle if the vehicle decelerates to a certain extent. Accordingly, it is possible to inhibit the deceleration of the vehicle 10 from making the driver feel something different.

The vehicle may further include: a second rotating electrical machine; a third transmission route connecting a second junction and the second rotating electrical machine, the second junction located on the first transmission route and closer to the wheel than the first switching device is; and a third switching device arranged on the third transmission route, and configured to be switched between a connecting state which connects the first transmission route and the second rotating electrical machine and a disconnecting state which disconnects the first transmission route and the second rotating electrical machine.

Thereby, the vehicle can be driven by the second rotating electrical machine with the first switching device in the connecting state. In that case, electric power can be generated by the first rotating electrical machine using the power from the internal combustion engine.

Furthermore, while the power is being transmitted from the internal combustion engine to the wheel with the first switching device in the connecting state, if the vehicle speed becomes greater than the first vehicle speed threshold value, the control circuit may perform control to switch the third switching device to the disconnecting state in addition to switching the second switching device to the disconnecting state. Thereby, for example, in the case where the second rotating electrical machine is disconnected from the first transmission route while the vehicle is being driven at high speed using the power from the internal combustion engine, it is possible to inhibit heat generation caused by eddy current produced by the second rotating electrical machine which would otherwise rotate using the power from the internal combustion engine. Accordingly, other measure for preventing the overheating of the second rotating electrical machine (for example, a restriction to be imposed on the output from the internal combustion engine) becomes no longer necessary. Thus, it is possible to inhibit a decrease in marketability of the vehicle and an additional cost increase which would otherwise be caused by such other measure.

While the control circuit is performing the control to drive the vehicle using the power from the internal combustion engine with the first switching device in the connecting state, and with the second switching device and the third switching device in the disconnecting state, if the vehicle is braked, the control circuit may switch the first switching device to the disconnecting state, and the third switching device to the connecting state, to make the second rotating electrical machine generate regenerative electric power. This makes it possible to inhibit loss in the regenerative energy caused by the internal combustion engine which would otherwise be made to idle while the second rotating electrical machine is generating the regenerative electric power.

Otherwise, in a case where as the rotating electrical machine, only the first rotating electrical machine is provided to the vehicle, the vehicle may include a third switching device arranged on the first transmission route and closer to the internal combustion engine than the first junction is, and configured to be switched between a connecting state which connects a combination of the wheel and the first rotating electrical machine to the internal combustion engine and a disconnecting state which disconnects the combination of the wheel and the first rotating electrical machine from the internal combustion engine.

This makes it possible to disconnect the internal combustion engine from the combination of the wheel and the first rotating electrical machine with the wheel and the first rotating electrical machine kept connected together. If this condition is used while the first rotating electrical machine is functioning as the regenerative brake in conjunction of the braking the vehicle, it is possible to efficiently recover the regenerative energy while the vehicle is braking. Furthermore, if the above condition is used while the vehicle is running using the first rotating electrical machine, it is possible to eliminate resistance which would otherwise be caused by the internal combustion engine, and thereby to enhance the driving efficiency (or the actual fuel mileage) of the vehicle.

According to the present embodiment, it is possible to achieve either or both of the improvement in the fuel efficiency of the vehicle and the enhancement in the driving performance of the vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
an internal combustion engine;
a first transmission route configured to transmit power produced by the internal combustion engine to a wheel;
a first switching device arranged on the first transmission route, and configured to be switched between a connecting state which connects the internal combustion engine and the wheel and a disconnecting state which disconnects the internal combustion engine and the wheel;
a first rotating electrical machine;
a second transmission route connecting a first junction and the first rotating electrical machine, the first junction located on the first transmission route and closer to the internal combustion engine than the first switching device is;
a second switching device arranged on the second transmission route, and configured to be switched between a connecting state which connects the first transmission route and the first rotating electrical machine and a disconnecting state which disconnects the first transmission route and the first rotating electrical machine; and
a control circuit configured to control the first switching device and the second switching device, wherein
while the power is being transmitted from the internal combustion engine to the wheel with the first switching device in the connecting state, if a vehicle speed of the vehicle becomes greater than a first vehicle speed threshold value, the control circuit performs control to switch the second switching device to the disconnecting state.

2. The vehicle according to claim 1, wherein
while the power is being transmitted from the internal combustion engine to the wheel with the first switching device in the connecting state, if the vehicle speed becomes greater than the first vehicle speed threshold value and the vehicle enters into a cruising state, the control circuit switches the second switching device from the connecting state to the disconnecting state.

3. The vehicle according to claim 1, further comprising
a torque limiter arranged on the second transmission route, and configured to limit transmission of the power from the internal combustion engine to the first rotating electrical machine.

4. The vehicle according to claim 1, wherein
when the first switching device is in the connecting state, the vehicle speed is greater than the first vehicle speed threshold value, and the second switching device is in the disconnecting state, the control circuit performs electric power generation preferential control to switch the first switching device from the connecting state to the disconnecting state, and the second switching device from the disconnecting state to the connecting state, to make the first rotating electrical machine generate electric power using the power from the internal combustion engine, and thereby to supply the electric power to at least one of an energy storage and an electrically-operated accessory of the vehicle.

5. The vehicle according to claim 4, wherein
when the first switching device is in the connecting state, the vehicle speed is greater than the first vehicle speed threshold value, and the second switching device is in the disconnecting state, if a state of charge in the energy storage becomes less than a predetermined state-of-charge threshold value, the control circuit switches the first switching device from the connecting state to the disconnecting state, and the second switching device from the disconnecting state to the connecting state, to make the first rotating electrical machine generate electric power using the power from the internal combustion engine, and thereby to charge the energy storage.

6. The vehicle according to claim 4, wherein
while the control circuit is performing the electric power generation preferential control, if the vehicle speed becomes less than a second vehicle speed threshold value, or if an absolute value of a time derivative value of the vehicle speed becomes greater than an acceleration threshold value, the control circuit switches the first switching device from the disconnecting state to the connecting state, and the second switching device from the connecting state to the disconnecting state.

7. The vehicle according to claim 1, further comprising:
a second rotating electrical machine;
a third transmission route connecting a second junction and the second rotating electrical machine, the second junction located on the first transmission route and closer to the wheel than the first switching device is; and
a third switching device arranged on the third transmission route, and configured to be switched between a connecting state which connects the first transmission route and the second rotating electrical machine and a disconnecting state which disconnects the first transmission route and the second rotating electrical machine, wherein
while the power is being transmitted from the internal combustion engine to the wheel with the first switching device in the connecting state, if the vehicle speed becomes greater than the first vehicle speed threshold value, the control circuit performs control to switch the third switching device to the disconnecting state in addition to switching the second switching device to the disconnecting state.

8. The vehicle according to claim 7, wherein
while the control circuit is performing the control to drive the vehicle using the power from the internal combustion engine with the first switching device in the connecting state, and with the second switching device and the third switching device in the disconnecting state, if the vehicle is braked, the control circuit switches the first switching device to the disconnecting state, and the third switching device to the connecting state, to make the second rotating electrical machine generate regenerative electric power.

9. The vehicle according to claim 1, further comprising
a third switching device arranged on the first transmission route and closer to the internal combustion engine than the first junction is, and configured to be switched between a connecting state which connects a combination of the wheel and the first rotating electrical machine to the internal combustion engine and a disconnecting state which disconnects the combination of the wheel and the first rotating electrical machine from the internal combustion engine.

10. A vehicle comprising:
an internal combustion engine;
a wheel;
a first transmission path via which power produced by the internal combustion engine is to be transmitted to the wheel;
a first clutch provided in the first transmission path to select a connection state between a first connecting state in which the internal combustion engine and the wheel are connected and a first disconnecting state in which the internal combustion engine and the wheel are disconnected, the first transmission path having a first junction provided between the first clutch and the internal combustion engine;
a first rotating electrical machine;
a second transmission path to connect the first junction to the first rotating electrical machine;
a second clutch provided in the second transmission path to select a connection state between a second connecting state in which the first transmission path and the first rotating electrical machine are connected via the second transmission path and a second disconnecting state in which the first transmission path and the first rotating electrical machine are disconnected; and
circuitry configured to control the first clutch and the second clutch such that the second clutch switches to the second disconnecting state in a case where the first clutch switches to the first connecting state so as to transmit the power from the internal combustion engine to the wheel and where a vehicle speed of the vehicle is larger than a first vehicle speed threshold value.

11. The vehicle according to claim 10, wherein
while the power is being transmitted from the internal combustion engine to the wheel with the first clutch in the first connecting state, if the vehicle speed becomes greater than the first vehicle speed threshold value and the vehicle enters into a cruising state, the circuitry switches the second clutch from the second connecting state to the second disconnecting state.

12. The vehicle according to claim 10, further comprising a torque limiter arranged on the second transmission path, and configured to limit transmission of the power from the internal combustion engine to the first rotating electrical machine.

13. The vehicle according to claim 10, wherein
when the first clutch is in the first connecting state, the vehicle speed is greater than the first vehicle speed threshold value, and the second clutch is in the second disconnecting state, the circuitry performs electric power generation preferential control to switch the first clutch from the first connecting state to the first disconnecting state, and the second clutch from the second disconnecting state to the second connecting state, to make the first rotating electrical machine generate electric power using the power from the internal combustion engine, and thereby to supply the electric power to at least one of an energy storage and an electrically-operated accessory of the vehicle.

14. The vehicle according to claim 13, wherein
when the first clutch is in the first connecting state, the vehicle speed is greater than the first vehicle speed threshold value, and the second clutch is in the second disconnecting state, if a state of charge in the energy storage becomes less than a predetermined state-of-charge threshold value, the circuitry switches the first clutch from the first connecting state to the first disconnecting state, and the second clutch from the second disconnecting state to the second connecting state, to make the first rotating electrical machine generate electric power using the power from the internal combustion engine, and thereby to charge the energy storage.

15. The vehicle according to claim 13, wherein
while the circuitry is performing the electric power generation preferential control, if the vehicle speed becomes less than a second vehicle speed threshold value, or if an absolute value of a time derivative value of the vehicle speed becomes greater than an acceleration threshold value, the circuitry switches the first clutch from the first disconnecting state to the first connecting state, and the second clutch from the second connecting state to the second disconnecting state.

16. The vehicle according to claim 10, further comprising:
a second rotating electrical machine;
a third transmission path connecting a second junction and the second rotating electrical machine, the second junction located on the first transmission path between the wheel and the first clutch; and
a third clutch arranged on the third transmission path, and configured to be switched between a third connecting state which connects the first transmission path and the second rotating electrical machine and a third disconnecting state which disconnects the first transmission path and the second rotating electrical machine, wherein
while the power is being transmitted from the internal combustion engine to the wheel with the first clutch in the first connecting state, if the vehicle speed becomes greater than the first vehicle speed threshold value, the circuitry performs control to switch the third clutch to the third disconnecting state in addition to switching the second clutch to the second disconnecting state.

17. The vehicle according to claim 16, wherein
while the circuitry is performing the control to drive the vehicle using the power from the internal combustion engine with the first clutch in the first connecting state, and with the second clutch and the third clutch in the second and third disconnecting states, if the vehicle is braked, the circuitry switches the first clutch to the first disconnecting state, and the third clutch to the third connecting state, to make the second rotating electrical machine generate regenerative electric power.

18. The vehicle according to claim 10, further comprising a third clutch arranged on the first transmission path between the internal combustion engine and the first junction, and configured to be switched between a connecting state which connects a combination of the wheel and the first rotating electrical machine to the internal combustion engine and a disconnecting state which disconnects the combination of the wheel and the first rotating electrical machine from the internal combustion engine.

19. A vehicle comprising:
an internal combustion engine;
a wheel;
a first transmission path via which power produced by the internal combustion engine is to be transmitted to the wheel;
a first clutch provided in the first transmission path to select a connection state between a first connecting state in which the internal combustion engine and the wheel are connected and a first disconnecting state in which the internal combustion engine and the wheel are disconnected, the first transmission path having a second junction provided between the first clutch and the wheel;

a second rotating electrical machine;

a third transmission path to connect the second junction to the second rotating electrical machine;

a third clutch provided in the third transmission path to select a connection state between a second connecting state in which the first power transmission path and the second rotating electrical machine are connected via the third power transmission path and a second disconnecting state in which the first power transmission path and the second rotating electrical machine are disconnected; and circuitry configured to control the first clutch and the third clutch such that the third clutch switches to the second disconnecting state in a case where the first clutch switches to the first connecting state so as to transmit the power from the internal combustion engine to the wheel and where a vehicle speed of the vehicle is larger than a first vehicle speed threshold value.

* * * * *